US009550568B2

(12) United States Patent
Roemerman et al.

(10) Patent No.: US 9,550,568 B2
(45) Date of Patent: Jan. 24, 2017

(54) WEAPON INTERFACE SYSTEM AND DELIVERY PLATFORM EMPLOYING THE SAME

(71) Applicant: Lone Star IP Holdings, LP, Addison, TX (US)

(72) Inventors: Steven D. Roemerman, Highland Village, TX (US); John P. Volpi, Garland, TX (US); Joseph Edward Tepera, Muenster, TX (US)

(73) Assignee: Lone Star IP Holdings, LP, Addison, TX (US)

( * ) Notice: Subject to any disclaimer, the term of this patent is extended or adjusted under 35 U.S.C. 154(b) by 0 days.

(21) Appl. No.: 13/975,609

(22) Filed: Aug. 26, 2013

(65) Prior Publication Data

US 2014/0230637 A1 Aug. 21, 2014

Related U.S. Application Data

(60) Continuation of application No. 13/399,873, filed on Feb. 17, 2012, now Pat. No. 8,516,938, which is a
(Continued)

(51) Int. Cl.
*B64D 1/04* (2006.01)
*B64D 1/06* (2006.01)
(Continued)

(52) U.S. Cl.
CPC . *B64D 1/04* (2013.01); *B64D 1/06* (2013.01); *F41F 3/06* (2013.01); *F41F 3/065* (2013.01); *F41F 5/00* (2013.01)

(58) Field of Classification Search
CPC ............... B64D 1/00; B64D 1/02; B64D 1/04; F41F 3/06
(Continued)

(56) References Cited

U.S. PATENT DOCUMENTS 1,039,850 A 10/1912 Voller et al.
1,240,217 A 9/1917 Ingram
(Continued)

FOREIGN PATENT DOCUMENTS

EP 0298494 1/1989
GB 2280736 * 2/1995
GB 2280736 A 2/1995

OTHER PUBLICATIONS

"DOE Handbook: Primer on Spontaneo Heating and Pyrophoricity," Dec. 1994, 87 pages, DOE-HKBK-1081-94, FSC-6910, U.S. Department of Energy, Washington, D.C.
(Continued)

*Primary Examiner* — Stephen M Johnson
(74) *Attorney, Agent, or Firm* — Boisbrun Hofman, PLLC

(57) ABSTRACT

A weapon interface system, and methods of operating the same. The weapon interface system is coupled to an electrical interconnection system of a delivery platform and a weapon system coupled to a rack system. The weapon interface system includes a translation interface configured to provide an interface between the electrical interconnection system and an inductive power and data circuit. The weapon interface system also includes a weapon coupler, coupled to the translation interface, configured to provide an inductive coupling to the weapon system to provide mission information thereto.

9 Claims, 14 Drawing Sheets

Related U.S. Application Data division of application No. 11/925,471, filed on Oct. 26, 2007, now Pat. No. 8,117,955.

(60) Provisional application No. 60/855,084, filed on Oct. 26, 2006.

(51) Int. Cl.
*F41F 3/06* (2006.01)
*F41F 3/065* (2006.01)
*F41F 5/00* (2006.01)

(58) Field of Classification Search
USPC .............. 89/1.59, 1.53, 1.54, 1.55, 1.58
See application file for complete search history.

(56) References Cited

U.S. PATENT DOCUMENTS

| | | | |
|---|---|---|---|
| 1,312,764 A | 8/1919 | Straub et al. | |
| 1,550,622 A | 8/1925 | Lesh | |
| 1,562,495 A | 11/1925 | Dalton | |
| 1,765,017 A | 6/1930 | Felix | |
| 2,295,442 A | 9/1942 | Wilhelm | |
| 2,350,140 A | 5/1944 | Wilton | |
| 2,397,088 A | 3/1946 | Clay | |
| 2,445,311 A | 7/1948 | Cooke et al. | |
| 2,621,732 A | 12/1952 | Ahlgren | |
| 2,737,889 A | 3/1956 | Barker et al. | |
| 2,767,656 A | 10/1956 | Zeamer | |
| 2,809,583 A | 10/1957 | Ortynsky et al. | |
| 2,852,981 A | 9/1958 | Caya | |
| 2,911,914 A | 11/1959 | Wynn et al. | |
| 2,934,286 A | 4/1960 | Kiernan | |
| 2,958,260 A | 11/1960 | Anderson | |
| 3,094,934 A | 6/1963 | Anthony | |
| 3,211,057 A | 10/1965 | White, Jr. et al. | |
| 3,242,861 A | 3/1966 | Reed, Jr | |
| 3,332,348 A | 7/1967 | Myers | |
| 3,372,890 A | 3/1968 | Bogard et al. | |
| 3,377,952 A | 4/1968 | Crockett | |
| 3,379,131 A | 4/1968 | Webb | |
| 3,387,606 A * | 6/1968 | Crafts et al. | 128/202.27 |
| 3,416,752 A | 12/1968 | Henmbree | |
| 3,429,262 A | 2/1969 | Kincheloe | |
| 3,440,963 A | 4/1969 | Luca | |
| 3,541,394 A * | 11/1970 | Brenneman et al. | 336/179 |
| 3,545,383 A | 12/1970 | Lucy | |
| 3,555,826 A | 1/1971 | Bennett, Jr. | |
| 3,625,106 A | 12/1971 | Russo | |
| 3,625,152 A | 12/1971 | Schneider | |
| 3,626,415 A | 12/1971 | Montgomery et al. | |
| 3,635,162 A | 1/1972 | Lohkamp et al. | |
| 3,667,342 A * | 6/1972 | Warnock et al. | 89/1.55 |
| 3,667,392 A * | 6/1972 | Grantham et al. | 102/265 |
| 3,703,844 A | 11/1972 | Bleikamp, Jr. | |
| 3,712,228 A | 1/1973 | Handler et al. | |
| 3,728,935 A | 4/1973 | Magorian | |
| 3,739,726 A | 6/1973 | Pintell | |
| 3,759,466 A | 9/1973 | Evers-Euterneck | |
| 3,763,786 A | 10/1973 | MacDonald | |
| 3,771,455 A | 11/1973 | Haas | |
| 3,786,757 A | 1/1974 | Goldstein et al. | |
| 3,789,337 A | 1/1974 | Sheppard | |
| 3,820,106 A | 6/1974 | Yamashita et al. | |
| 3,872,770 A | 3/1975 | McGuire | |
| 3,887,991 A | 6/1975 | Panella | |
| 3,941,059 A | 3/1976 | Cobb | |
| 3,943,854 A | 3/1976 | Zwicker | |
| 3,954,060 A | 5/1976 | Haag et al. | |
| 3,956,990 A | 5/1976 | Rowe | |
| 3,995,792 A | 12/1976 | Otto et al. | |
| 3,998,124 A | 12/1976 | Milhous et al. | |
| 4,015,527 A | 4/1977 | Evans | |
| 4,036,140 A | 7/1977 | Korr et al. | |
| 4,063,508 A | 12/1977 | Whiting | |
| 4,091,734 A | 5/1978 | Redmond et al. | |
| 4,106,726 A | 8/1978 | Emmons et al. | |
| 4,109,579 A | 8/1978 | Carter | |
| 4,112,843 A | 9/1978 | Laviolette | |
| 4,172,407 A | 10/1979 | Wentink | |
| 4,211,169 A | 7/1980 | Brothers | |
| 4,291,848 A | 9/1981 | Clark | |
| 4,364,531 A | 12/1982 | Knoski | |
| 4,383,661 A | 5/1983 | Ottenheimer et al. | |
| 4,408,537 A | 10/1983 | Fortier | |
| 4,430,941 A | 2/1984 | Raech, Jr. et al. | |
| 4,478,127 A | 10/1984 | Hennings et al. | |
| 4,498,394 A | 2/1985 | Regebro | |
| 4,522,356 A | 6/1985 | Lair et al. | |
| 4,616,554 A | 10/1986 | Spink et al. | |
| 4,625,646 A | 12/1986 | Pinson | |
| 4,638,737 A | 1/1987 | McIngvale | |
| 4,648,324 A | 3/1987 | McDermott | |
| 4,709,877 A | 12/1987 | Goulding | |
| 4,714,020 A | 12/1987 | Hertsgaard et al. | |
| 4,744,301 A | 5/1988 | Cardoen | |
| 4,750,404 A | 6/1988 | Dale | |
| 4,750,423 A | 6/1988 | Nagabhushan | |
| 4,756,227 A | 7/1988 | Ash et al. | |
| 4,770,101 A | 9/1988 | Robertson et al. | |
| 4,775,432 A | 10/1988 | Kolonko et al. | |
| 4,777,882 A | 10/1988 | Dieval | |
| 4,803,928 A | 2/1989 | Kramer et al. | |
| 4,824,053 A | 4/1989 | Sarh | |
| 4,834,531 A | 5/1989 | Ward | |
| 4,842,218 A | 6/1989 | Groutage et al. | |
| 4,860,969 A | 8/1989 | Muller et al. | |
| 4,870,885 A | 10/1989 | Grosselin et al. | |
| 4,882,970 A | 11/1989 | Kovar | |
| 4,922,799 A | 5/1990 | Bartl et al. | |
| 4,922,826 A | 5/1990 | Busch et al. | |
| 4,932,326 A | 6/1990 | Ladriere | |
| 4,934,269 A | 6/1990 | Powell | |
| 4,936,187 A * | 6/1990 | Teeter | 89/1.55 |
| 4,957,046 A | 9/1990 | Puttock | |
| 4,996,923 A | 3/1991 | Theising | |
| 5,027,413 A | 6/1991 | Barnard | |
| 5,034,686 A * | 7/1991 | Aspelin | 324/537 |
| 5,042,357 A * | 8/1991 | Schaff et al. | 89/1.55 |
| 5,056,408 A | 10/1991 | Joner et al. | |
| 5,088,381 A * | 2/1992 | Lamarque et al. | 89/1.814 |
| 5,107,766 A | 4/1992 | Schliesske et al. | |
| 5,107,767 A | 4/1992 | Schneider et al. | |
| 5,127,605 A | 7/1992 | Atchison et al. | |
| 5,132,843 A | 7/1992 | Aoyama et al. | |
| 5,231,928 A | 8/1993 | Phillips et al. | |
| 1,077,989 A | 11/1993 | Stevens | |
| 5,311,820 A | 5/1994 | Ellingsen | |
| 5,322,998 A | 6/1994 | Jackson | |
| 5,325,786 A | 7/1994 | Petrovich | |
| 5,348,596 A | 9/1994 | Goleniewski et al. | |
| 5,364,290 A * | 11/1994 | Hartman | 439/517 |
| 5,413,048 A | 5/1995 | Werner et al. | |
| 5,438,366 A | 8/1995 | Jackson et al. | |
| 5,440,994 A | 8/1995 | Alexander | |
| 5,445,861 A | 8/1995 | Newton et al. | |
| 5,451,014 A | 9/1995 | Dare et al. | |
| 5,461,982 A | 10/1995 | Boyer | |
| 5,467,940 A | 11/1995 | Steuer | |
| 5,529,262 A | 6/1996 | Horwath | |
| 5,541,603 A | 7/1996 | Read et al. | |
| 5,546,358 A | 8/1996 | Thomson | |
| 5,561,261 A | 10/1996 | Lindstadt et al. | |
| 5,567,906 A | 10/1996 | Reese et al. | |
| 5,567,912 A | 10/1996 | Manning et al. | |
| 5,681,008 A | 10/1997 | Kinstler | |
| 5,682,266 A | 10/1997 | Meyers et al. | |
| 5,691,502 A | 11/1997 | Craddock et al. | |
| 5,698,815 A | 12/1997 | Ragner | |
| 5,728,968 A | 3/1998 | Buzzett et al. | |
| 5,796,031 A | 8/1998 | Sigler | |
| 5,816,532 A | 10/1998 | Zasadny et al. | |
| 5,834,684 A | 11/1998 | Taylor | |
| 5,969,864 A | 10/1999 | Chen et al. | |

(56) References Cited

U.S. PATENT DOCUMENTS

| | | | |
|---|---|---|---|
| 5,978,139 A | 11/1999 | Hatakoshi et al. |
| 5,988,071 A | 11/1999 | Taylor |
| 6,019,317 A | 2/2000 | Simmons et al. |
| 6,021,716 A | 2/2000 | Taylor |
| 6,105,505 A | 8/2000 | Jones |
| 6,174,494 B1 | 1/2001 | Lowden et al. |
| 6,216,595 B1 | 4/2001 | Lamorlette et al. |
| 6,253,679 B1 | 7/2001 | Woodall et al. |
| 6,293,202 B1 | 9/2001 | Woodall et al. |
| 6,324,985 B1 | 12/2001 | Petrusha |
| 6,338,242 B1 | 1/2002 | Kim et al. |
| 6,349,898 B1 | 2/2002 | Leonard et al. |
| 6,374,744 B1 | 4/2002 | Schmacker et al. |
| 6,389,977 B1 | 5/2002 | Schmacker et al. |
| 6,523,477 B1 | 2/2003 | Brooks et al. |
| 6,523,478 B1 | 2/2003 | Gonzalez et al. |
| 6,540,175 B1 | 4/2003 | Mayersak et al. |
| 6,546,838 B2 | 4/2003 | Zavitsanos et al. |
| 6,604,436 B1 | 8/2003 | Lewandowski et al. |
| 6,615,116 B2 | 9/2003 | Ebert et al. |
| 6,666,123 B1 | 12/2003 | Adams et al. |
| 6,679,454 B2 | 1/2004 | Olsen et al. |
| 6,691,947 B2 | 2/2004 | La Fata |
| 6,705,571 B2 | 3/2004 | Shay et al. |
| 6,779,754 B2 | 8/2004 | Hellman |
| 6,832,740 B1 | 12/2004 | Ransom |
| 6,834,835 B1 | 12/2004 | Knowles et al. |
| 6,869,044 B2 | 3/2005 | Geswender et al. |
| 6,871,817 B1 | 3/2005 | Knapp |
| 6,880,780 B1 | 4/2005 | Perry |
| 6,910,661 B2 | 6/2005 | Dockter et al. |
| 6,933,877 B1 | 8/2005 | Halladay et al. |
| 7,019,650 B2 | 3/2006 | Volpi et al. |
| 7,032,858 B2 | 4/2006 | Williams |
| 7,051,974 B2 | 5/2006 | Stuhr |
| 7,083,140 B1 | 8/2006 | Dooley |
| 7,121,210 B2 | 10/2006 | Steele |
| 7,143,698 B2 | 12/2006 | Lloyd |
| 7,156,347 B2 | 1/2007 | Lam et al. |
| 7,221,847 B2 | 5/2007 | Gardiner et al. |
| 7,325,769 B2 | 2/2008 | Harnisch et al. |
| 7,340,986 B1 | 3/2008 | Gaigler |
| 7,474,476 B2 | 1/2009 | Ueta et al. |
| 7,501,948 B2 | 3/2009 | Roemerman et al. |
| 7,503,527 B1 | 3/2009 | Fairchild |
| 7,530,315 B2 | 5/2009 | Tepera et al. |
| 7,690,304 B2 | 4/2010 | Roemerman et al. |
| 7,789,343 B2 | 9/2010 | Sarh et al. |
| 7,895,946 B2 | 3/2011 | Roemerman et al. |
| 7,958,810 B2 | 6/2011 | Roemerman et al. |
| 8,016,249 B2 | 9/2011 | Sar et al. |
| 8,042,471 B2 | 10/2011 | Michel et al. |
| 8,049,869 B2 | 11/2011 | Flowers |
| 8,127,683 B2 | 3/2012 | Tepera et al. |
| 8,502,126 B2 | 8/2013 | Tyree |
| 8,541,724 B2 | 9/2013 | Roemerman |
| 8,661,980 B1 | 3/2014 | Roemerman et al. |
| 8,661,981 B2 | 3/2014 | Roemerman et al. |
| 9,006,628 B2 | 4/2015 | Roemerman et al. |
| 2003/0051629 A1 | 3/2003 | Zavitsanos et al. |
| 2003/0056680 A1 | 3/2003 | Santacreu |
| 2003/0123159 A1 | 7/2003 | Morita et al. |
| 2003/0146342 A1 | 8/2003 | Hellman |
| 2003/0192992 A1 | 10/2003 | Olsen et al. |
| 2004/0174261 A1 | 9/2004 | Volpi et al. |
| 2005/0127242 A1 | 6/2005 | Rivers, Jr. |
| 2005/0180337 A1 | 8/2005 | Roemerman et al. |
| 2005/0201450 A1 | 9/2005 | Volpi et al. |
| 2005/0274844 A1 | 12/2005 | Stuhr |
| 2006/0017545 A1 | 1/2006 | Volpi et al. |
| 2006/0077036 A1 | 4/2006 | Roemerman et al. |
| 2006/0198033 A1 | 9/2006 | Soyama et al. |
| 2007/0035383 A1 | 2/2007 | Roemerman et al. |
| 2007/0157843 A1 | 7/2007 | Roemerman et al. |
| 2008/0062412 A1 | 3/2008 | Kravitz |
| 2009/0026321 A1 | 1/2009 | Sarh et al. |
| 2009/0078146 A1 | 3/2009 | Tepera et al. |
| 2009/0100995 A1 | 4/2009 | Fisher |
| 2009/0228159 A1 | 9/2009 | Flowers et al. |
| 2009/0283643 A1 | 11/2009 | Sar et al. |
| 2010/0031841 A1 | 2/2010 | Michel et al. |
| 2010/0264253 A1 | 10/2010 | Taylor et al. |
| 2010/0282893 A1 | 11/2010 | Roemerman et al. |
| 2010/0326264 A1 | 12/2010 | Roemerman et al. |
| 2011/0017864 A1 | 1/2011 | Roemerman et al. |
| 2011/0108660 A1 | 5/2011 | Roemerman et al. |
| 2011/0179963 A1 | 7/2011 | Tepera et al. |
| 2011/0233322 A1 | 9/2011 | Holicki et al. |
| 2012/0119013 A1 | 5/2012 | Roemerman et al. |
| 2012/0145822 A1 | 6/2012 | Roemerman et al. |
| 2012/0152091 A1 | 6/2012 | Roemerman et al. |
| 2012/0199689 A1 | 8/2012 | Burkland |
| 2012/0256730 A1 | 10/2012 | Scott et al. |
| 2012/0292431 A1 | 11/2012 | Patel et al. |
| 2014/0026777 A1 | 1/2014 | Tepera et al. |

OTHER PUBLICATIONS

Andersson, O., et al., "High Velocity Jacketed Long Rod Projectiles Hitting Oblique Steel Plates," 19th International Symposium of Ballistics, May 7-11, 2001, pp. 1241-1247, Interlaken, Switzerland.

Rabkin, N. J., et al., "Operation Desert Storm: Casualties Caed by Improper Handling of Unexploded U.S. Submunitions," GAO Report to Congressional Requestors, Aug. 1993, 24 pages, GAO/NSIAD-93-212, United States General Accounting Office, Washington, D.C.

Smart, M.C., et al., "Performance Characteristics of Lithium Ion Cells at Low Temperatures," IEEE AESS Systems Magazine, Dec. 2002, pp. 16-20, IEEE, Los Alamitos, CA.

"UNICEF What's New?: Highlight: Unexploded Ordnance (UXO)," http://www.unicef.org.vn/uxo.htm, downloaded Mar. 8, 2005, 3 pages.

* cited by examiner

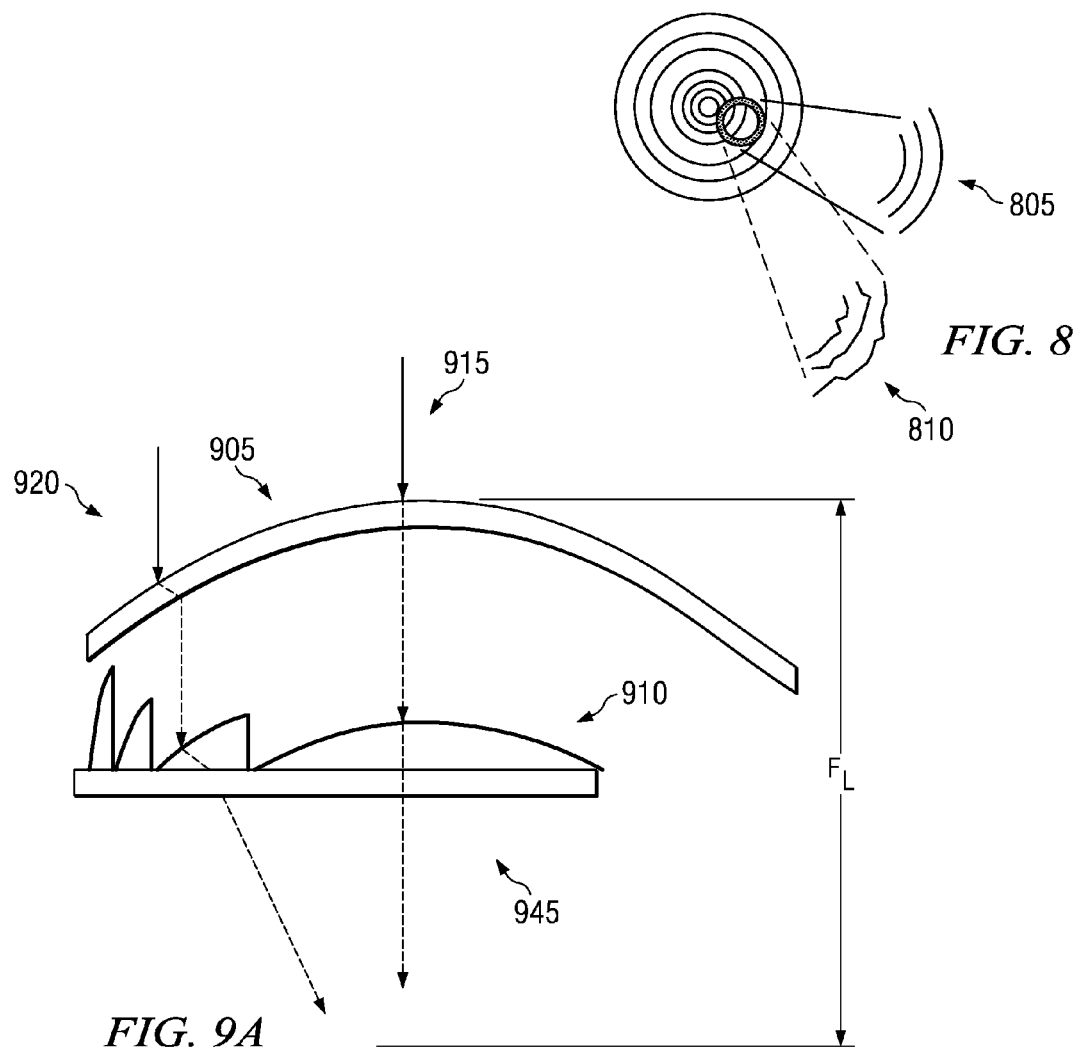
FIG. 8
FIG. 9A
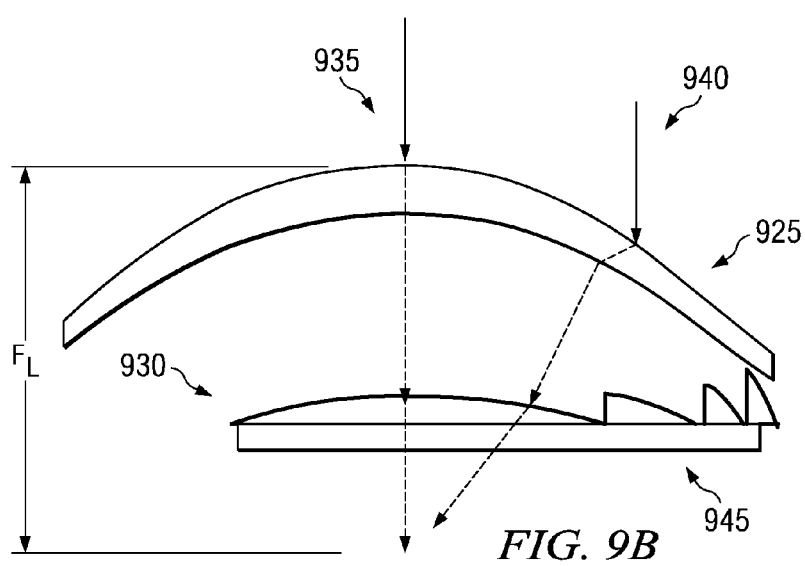
FIG. 9B

US 9,550,568 B2

1

WEAPON INTERFACE SYSTEM AND DELIVERY PLATFORM EMPLOYING THE SAME

This application is a continuation of U.S. patent application Ser. No. 13/399,873 entitled "Weapon Interface System and Delivery Platform Employing the Same," filed Feb. 17, 2012 2013 currently allowed, issuing as U.S. Pat. No. 8,516,938, issued August 27, which claims the benefit of U.S. patent application Ser. No. 11/925,471 entitled "Weapon Interface System and Delivery Platform Employing the Same," filed Oct. 26, 2007, now U.S. Pat. No. 8,117,955, issued Feb. 21, 2012, which claims the benefit of U.S. Provisional Application No. 60/855,084 entitled "Weapon System, and Weapon Enhancements for Increased Mission Effectiveness and Decreased Mission Time Lines," filed Oct. 26, 2006, which applications are incorporated herein by reference.

TECHNICAL FIELD

The present invention is directed, in general, to weapon systems and, more specifically, to a weapon interface system, and method of operating the same.

BACKGROUND

Present rules of engagement demand that precision guided weapons and weapon systems are necessary. According to well-documented reports, precision guided weapons have made up about 53 percent of all strike weapons employed by the United States from 1995 to 2003. The trend toward the use of precision weapons will continue. Additionally, strike weapons are used throughout a campaign, and in larger numbers than any other class of weapons. This trend will be even more pronounced as unmanned airborne vehicles ("UAVs") take on attack roles.

Each weapon carried on a launch platform (e.g., aircraft, ship, artillery) must be tested for safety, compatibility, and effectiveness. In some cases, these qualification tests can cost more to perform than the costs of the development of the weapon system. As a result, designers often choose to be constrained by earlier qualifications. In the case of smart weapons, this qualification includes data compatibility efforts. Examples of this philosophy can be found in the air to ground munitions ("AGM")-154 joint standoff weapon ("JSOW"), which was integrated with a number of launch platforms. In the process, a set of interfaces were developed, and a number of other systems have since been integrated which used the data sets and precedents developed by the AGM-154. Such qualifications can be very complex.

An additional example is the bomb live unit ("BLU")-116, which is essentially identical to the BLU-109 warhead in terms of weight, center of gravity and external dimensions. However, the BLU-116 has an external "shroud" of light metal (presumably aluminum alloy or something similar) and a core of hard, heavy metal. Thus, the BLU-109 was employed to reduce qualification costs of the BLU-116.

Another means used to minimize the time and expense of weapons integration is to minimize the changes to launch platform software. As weapons have become more complex, this has proven to be difficult. As a result, the delay in operational deployment of new weapons has been measured in years, often due solely to the problem of aircraft software integration.

Some weapons such as the Paveway II laser guided bomb [also known as the guided bomb unit ("GBU")-12] have no

2 data or power interface to the launch platform. Clearly, it is highly desirable to minimize this form of interface and to, therefore, minimize the cost and time needed to achieve military utility.

Another general issue to consider is that low cost weapons are best designed with modularity in mind. This generally means that changes can be made to an element of the total weapon system, while retaining many existing features, again with cost and time in mind.

Another consideration is the matter of avoiding unintended damage, such as damage to non-combatants. Such damage can take many forms, including direct damage from an exploding weapon, or indirect damage. Indirect damage can be caused by a "dud" weapon going off hours or weeks after an attack, or if an enemy uses the weapon as an improvised explosive device. The damage may be inflicted on civilians or on friendly forces.

One term of reference is "danger close," which is the term included in the method of engagement segment of a call for fire that indicates that friendly forces or non-combatants are within close proximity of the target. The close proximity distance is determined by the weapon and munition fired. In recent United States engagements, insurgent forces fighting from urban positions have been difficult to attack due to such considerations.

To avoid such damage, a number of data elements may be provided to the weapon before launch, examples of such data include information about coding on a laser designator, so the weapon will home in on the right signal. Another example is global positioning system ("GPS") information about where the weapon should go, or areas that must be avoided. Other examples could be cited, and are familiar to those skilled in the art.

Therefore, what is needed is a small smart weapon that can be accurately guided to an intended target with the effect of destroying that target with little or no collateral damage of other nearby locations. Also, what is needed is such a weapon having many of the characteristics of prior weapons already qualified in order to substantially reduce the cost and time for effective deployment. Also, what is needed is a weapon that does not require the use of mechanical connectors or lanyards for proper operation.

SUMMARY OF THE INVENTION

These and other problems are generally solved or circumvented, and technical advantages are generally achieved, by advantageous embodiments of the present invention, which includes a weapon interface system, and methods of operating the same. In one embodiment, the weapon interface system is coupled to an electrical interconnection system of a delivery platform and a weapon system coupled to a rack system. The weapon interface system includes a translation interface configured to provide an interface between the electrical interconnection system and an inductive power and data circuit. The weapon interface system also includes a weapon coupler, coupled to the translation interface, configured to provide an inductive coupling to the weapon system to provide mission information thereto.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 8 illustrates a diagram of an embodiment of a pseudorandom pattern for a FFL constructed in accordance with the principles of the present invention;

FIGS. 9A and 9B illustrate views of an embodiment of hybrid optics employable with a guidance section of a weapon constructed in accordance with the principles of the present invention;

DETAILED DESCRIPTION OF ILLUSTRATIVE EMBODIMENTS

Figure 1:
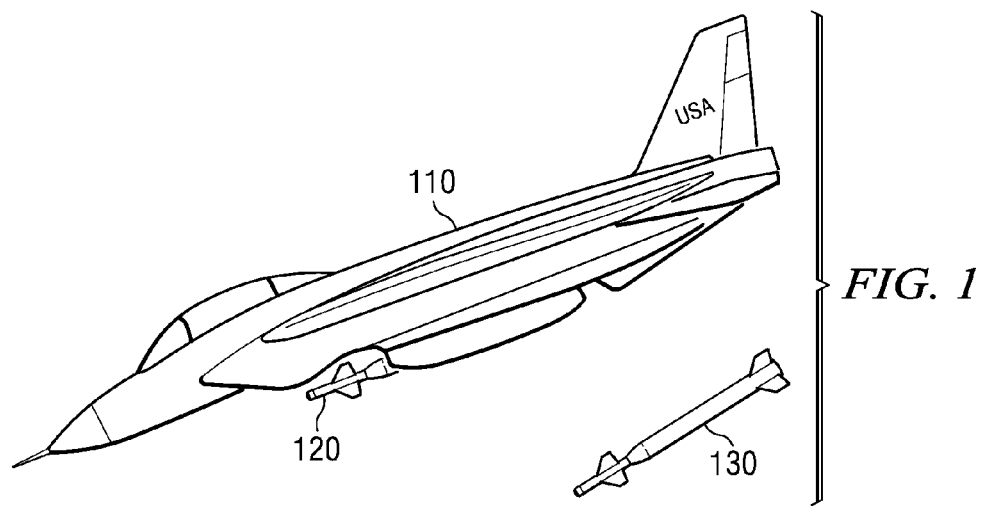
FIG. 1 illustrates a view of an embodiment of a weapon system in accordance with the principles of the present invention.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

It should be understood that the military utility of the weapon can only be fully estimated in the context of a so-called system of systems, which includes a guidance section or system, the delivery vehicle or launch platform, and other things, in addition to the weapon per se. In this sense, a weapon system is disclosed herein, even when we are describing a weapon per se. One example is seen in the discussion of the GBU-12, wherein design choices within the weapon were reflected in the design and operation of many aircraft that followed the introduction of the GBU-12. Another example is the use of a laser designator for laser guided weapons. Design choices in the weapon can enhance or limit the utility of the designator. Other examples can be cited. Those skilled in the art will understand that the discussion of the weapon per se inherently involves a discussion of the larger weapon system of systems. Therefore, improvements within the weapon often result in corresponding changes or improvements outside the weapon, and new teachings about weapons teach about weapon platforms, and other system of systems elements.

In accordance therewith, a class of warhead assemblies, constituting systems, methods, and devices, with many features, including multiple, modular guidance subsystems, avoidance of collateral damage, unexploded ordinance, and undesirable munitions sensitivity is described herein. In an exemplary embodiment, the warheads are Mark derived (e.g., MK-76) or bomb dummy unit ("BDU") derived (e.g., BDU-33) warheads. The MK-76 is about four inches in diameter, 24.5 inches in length, 95-100 cubic inches ("cu") in internal volume, 25 pounds ("1 bs") and accommodates a 0.85 inch diameter practice bomb cartridge. This class of assemblies is also compatible with existing weapon envelopes of size, shape, weight, center of gravity, moment of inertia, and structural strength to avoid lengthy and expensive qualification for use with manned and unmanned platforms such as ships, helicopters, self-propelled artillery and fixed wing aircraft, thus constituting systems and methods for introducing new weapon system capabilities more quickly and at less expense. In addition, the weapon system greatly increases the number of targets that can be attacked by a single platform, whether manned or unmanned.

In an exemplary embodiment, the general system envisioned is based on existing shapes, such as the MK-76, BDU-43, or laser guided training round ("LGTR"). The resulting system can be modified by the addition or removal of various features, such as global positioning system ("GPS") guidance, and warhead features. In addition, non-explosive warheads, such as those described in U.S. patent application Ser. No. 10/841,192 entitled "Weapon and Weapon System Employing The Same," to Roemerman, et al., filed May 7, 2004, and U.S. patent application Ser. No. 10/997,617, entitled "Weapon and Weapon System Employing the Same," to Tepera, et al., filed Nov. 24, 2004, now U.S. Pat. No. 7,530,315, which are incorporated herein by reference, may also be employed with the weapon according to the principles of the present invention. Additionally, a related weapon and weapon system is provided in U.S. patent application Ser. No. 11/706,489, entitled "Small Smart Weapon and Weapon System Employing the Same," filed Feb. 15, 2007, now U.S. Pat. No. 7,895,946, which is a continuation-in-part of U.S. patent application Ser. No. 11/541,207, entitled "Small Smart Weapon and Weapon System Employing the Same," filed Sep. 29, 2006, now U.S. Pat. No. 7,690,304, which are incorporated herein by reference.

Another feature of the system is the use of system elements for multiple purposes. For example, the central structural element of the MK-76 embodiment includes an optics design with a primary optical element, which is formed in the mechanical structure rather than as a separate component. Another example is the use of an antenna for both radio guidance purposes, such as GPS, and for handoff communication by means such as those typical of a radio frequency identification ("RFID") system. For examples of RFID related systems, see U.S. Patent Application Publication No. 2007/0035383, entitled "Radio Frequency Identification Interrogation Systems and Methods of Operating the Same," to Roemerman, et al., filed Aug. 9, 2006, U.S. Pat. No. 7,019,650 entitled "Interrogator and Interrogation System Employing the Same," to Volpi, et al., issued on Mar. 28, 2006, U.S. Patent Application Publication No. 2006/0077036, entitled "Interrogation System Employing Prior Knowledge About An Object To Discern An Identity Thereof," to Roemerman, et al., filed Sep. 29, 2005, U.S. Patent Application Publication No. 2006/0017545, entitled "Radio Frequency Identification Interrogation Systems and Methods of Operating the Same," to Volpi, et al., filed Mar. 25, 2005, U.S. Patent Application Publication No. 2005/0201450, entitled "Interrogator And Interrogation System Employing The Same," to Volpi, et al., filed Mar. 3, 2005, all of which are incorporated herein by reference.

Referring now to FIG. 1, illustrated is a view of an embodiment of a weapon system in accordance with the principles of the present invention. The weapon system includes a delivery platform such as a delivery vehicle (e.g., an airplane such as an F-14) 110 and at least one weapon. As demonstrated, a first weapon 120 is attached to the delivery vehicle (e.g., a wing station) and a second weapon 130 is deployed from the delivery vehicle 110 intended for a target. Of course, the first weapon 120 may be attached to a rack in the delivery vehicle or a bomb bay therein.

The weapon system is configured to provide energy as derived, without limitation, from a velocity and altitude of the delivery vehicle 110 in the form of kinetic energy ("KE") and potential energy to the first and second weapons 120, 130 and, ultimately, the warhead and destructive elements therein. The first and second weapons 120, 130 when released from the delivery vehicle 110 provide guided motion for the warhead to the target. The energy transferred from the delivery vehicle 110 as well as any additional energy acquired through the first and second weapons 120, 130 through propulsion, gravity or other parameters, provides the kinetic energy to the warhead to perform the intended mission. While the first and second weapons 120, 130 described with respect to FIG. 1 represent precision guided weapons, those skilled in the art understand that the principles of the present invention also apply to other types of weapons including weapons that are not guided by guidance technology or systems.

In general, it should be understood that other delivery vehicles including other aircraft may be employed such that the weapons contain significant energy represented as kinetic energy plus potential energy. As mentioned above, the kinetic energy is equal to "$½ mv^2$," and the potential energy is equal to "mgh" where "m" is the mass of the weapon, "g" is gravitational acceleration equal to 9.8 M/sec$^2$, and "h" is the height of the weapon at its highest point with respect to the height of the target. Thus, at the time of impact, the energy of the weapon is kinetic energy, which is directed into and towards the destruction of the target with little to no collateral damage of surroundings. Additionally, the collateral damage may be further reduced if the warhead is void of an explosive charge.

Figure 2:
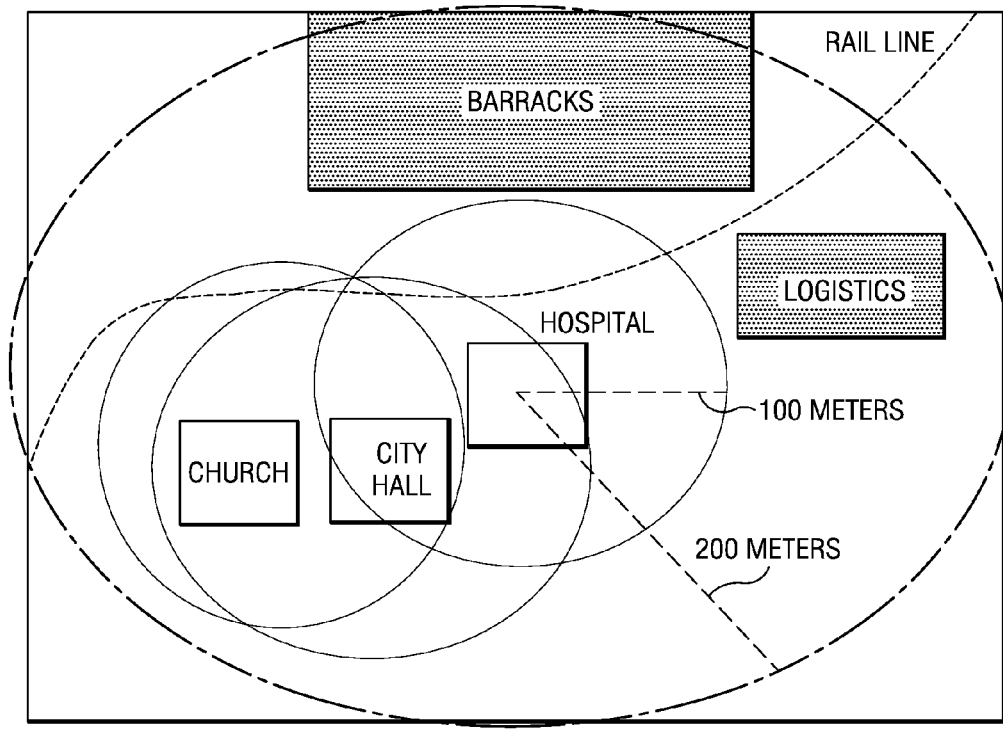
FIG. 2 illustrates a diagram demonstrating a region including a target zone for a weapon system in accordance with the principles of the present invention.

Turning now to FIG. 2, illustrated is a diagram demonstrating a region including a target zone for a weapon system in accordance with the principles of the present invention. The entire region is about 200 meters (e.g., about 2.5 city blocks) and the structures that are not targets take up a significant portion of the region. For instance, the weapon system would not want to target the hospital and a radius including about a 100 meters thereabout. In other words, the structures that are not targets are danger close to the targets. A barracks and logistics structure with the rail line form the targets in the illustrated embodiment.

Figure 3:
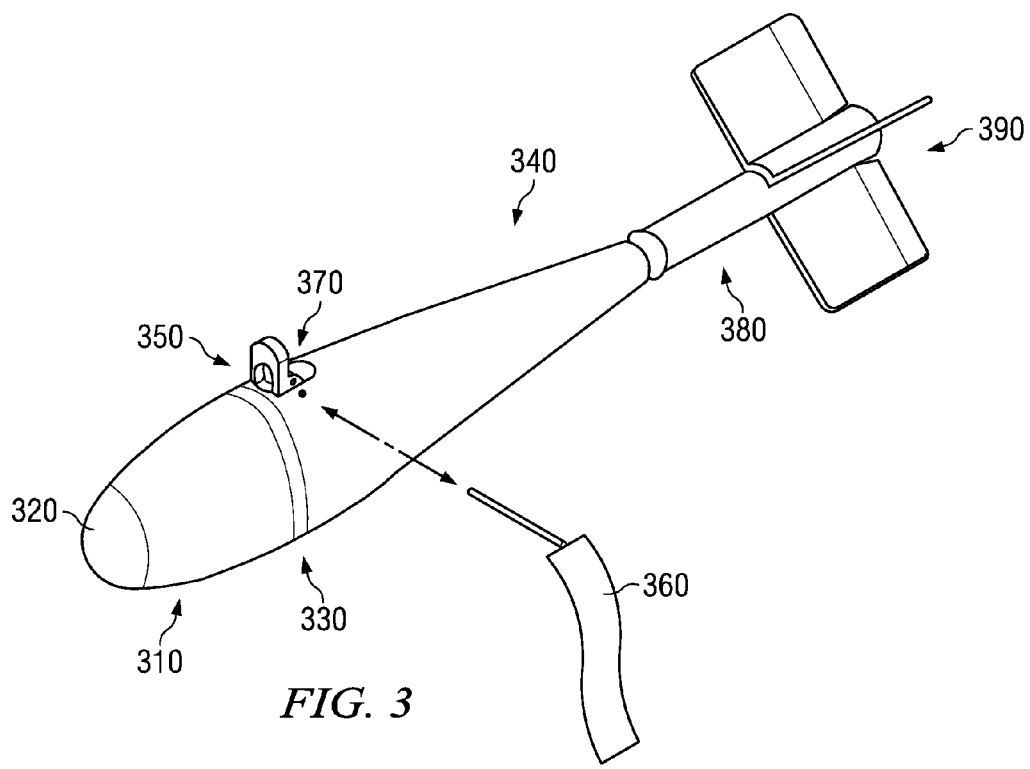
FIG. 3 illustrates a perspective view of an embodiment of a weapon constructed according to the principles of the present invention.

Turning now to FIG. 3, illustrated is a perspective view of an embodiment of a weapon constructed according to the principles of the present invention. The weapon includes a guidance section 310 including a target sensor (e.g., a laser seeker) 320, and guidance and control electronics and logic to guide the weapon to a target. The target sensor 320 may include components and subsystems such as a crush switch, a semi-active laser based terminal seeker ("SAL") quad detector, a net cast corrector and lenses for an optical system. In accordance with SAL systems, net cast optics are suitable, since the spot for the terminal seeker is normally defocused.

The guidance section 310 may include components and subsystems such as a GPS, an antenna such as a ring antenna 330 (e.g., dual use handoff and data and mission insertion similar to radio frequency identification and potentially also including responses from the weapon via similar means), a multiple axis microelectomechanical gyroscope, safety and arming devices, fuzing components, a quad detector, a communication interface [e.g., digital subscriber line ("DSL")], and provide features such as low power warming for fast acquisition and inductive handoff with a personal information manager. In the illustrated embodiment, the antenna 330 is about a surface of the weapon. Thus, the antenna is configured to receive mission information such as location, laser codes, GPS ephemerides and the like before launching from a delivery vehicle to guide the weapon to a target. The antenna is also configured to receive instructions after launching from the delivery vehicle to guide the weapon to the target. The weapon system, therefore, includes a communication system, typically within the delivery vehicle, to communicate with the weapon, and to achieve other goals and ends in the context of weapon system operation. It should be understood that the guidance section 310 contemplates, without limitation, laser guided, GPS guided, and dual mode laser and GPS guided systems. It should be understood that this antenna may be configured to receive various kinds of electromagnetic energy, just as there are many types of RFID tags that are configured to receive various kinds of electromagnetic energy.

The weapon also includes a warhead 340 (e.g., a unitary configuration) having destructive elements (formed from explosive or non-explosive materials), mechanisms and elements to articulate aerodynamic surfaces. A folding lug switch assembly 350, safety pin 360 and cavity 370 are also coupled to the guidance section 310 and the warhead 340. The guidance section 310 is in front of the warhead 340. The folding lug switch assembly 350 projects from a surface of the weapon. The weapon still further includes an aft section 380 behind the warhead 340 including system power elements, a ballast, actuators, flight control elements, and tail fins 390.

For instances when the target sensor is a laser seeker, the laser seeker detects the reflected energy from a selected target which is being illuminated by a laser. The laser seeker provides signals so as to drive the control surfaces in a manner such that the weapon is directed to the target. The tail fins 390 provide both stability and lift to the weapon. Modern precision guided weapons can be precisely guided to a specific target so that considerable explosive energy is often not needed to destroy an intended target. In many instances, kinetic energy discussed herein may be sufficient to destroy a target, especially when the weapon can be directed with sufficient accuracy to strike a specific designated target.

The destructive elements of the warhead 340 may be constructed of non-explosive materials and selected to achieve penetration, fragmentation, or incendiary effects. The destructive elements (e.g., shot) may include an incendiary material such as a pyrophoric material (e.g., zirconium) therein. The term "shot" generally refers a solid or hollow spherical, cubic, or other suitably shaped element constructed of explosive or non-explosive materials, without the aerodynamic characteristics generally associated with, for instance, a "dart." The shot may include an incendiary material such as a pyrophoric material (e.g., zirconium) therein. Inasmuch as the destructive elements of the warhead are a significant part of the weapon, the placement of these destructive elements, in order to achieve the overall weight and center of gravity desired, is an important element in the design of the weapon.

The non-explosive materials applied herein are substantially inert in environments that are normal and under benign conditions. Nominally stressing environments such as experienced in normal handling are generally insufficient to cause the selected materials (e.g., tungsten, hardened steel, zirconium, copper, depleted uranium and other like materials) to become destructive in an explosive or incendiary manner. The latent lethal explosive factor is minimal or non-existent. Reactive conditions are predicated on the application of high kinetic energy transfer, a predominantly physical reaction, and not on explosive effects, a predominantly chemical reaction.

The folding lug switch assembly 350 is typically spring-loaded to fold down upon release from, without limitation, a rack on an aircraft. The folding lug switch assembly 350 permits initialization after launch (no need to fire thermal batteries or use other power until the bomb is away) and provides a positive signal for a fuze. The folding lug switch assembly 350 is consistent with the laser guided bomb ("LGB") strategy using lanyards, but without the logistics issues of lanyards. The folding lug switch assembly 350 also makes an aircraft data and power interface optional and supports a visible "remove before flight" pin. The folding lug switch assembly 350 provides a mechanism to attach the weapon to a delivery vehicle and is configured to close after launching from the delivery vehicle thereby satisfying a criterion to arm the warhead. It should be understood, however, that the folding lug switch assembly 350, which is highly desirable in some circumstances, can be replaced with other means of carriage and suspension, and is only one of many features of the present invention, which can be applied in different combinations to achieve the benefits of the weapon system.

Typically, the safety pin 360 is removed from the folding lug switch assembly 350 and the folding lug switch assembly 350 is attached to a rack of an aircraft to hold the folding lug switch assembly 350 in an open position prior to launch. Thus, the safety pin 360 provides a mechanism to arm the weapon. Once the weapon is launched from the aircraft, the folding lug switch assembly 350 folds down into the cavity 370 and provides another mechanism to arm the weapon. A delay circuit between the folding lug switch assembly 350 and the fuze may be yet another mechanism to arm or provide time to disable the weapon after launch. Therefore, there are often three mechanisms that are satisfied before the weapon is ultimately armed enroute to the target.

A number of circuits are now well understood that use power from radio frequency or inductive fields to power a receiving chip and store data. The antenna includes an interface to terminate with the aircraft interface at the rack for loading relevant mission information including target, location, laser codes, GPS ephemerides and the like before being launched. Programming may be accomplished by a hand-held device similar to a fuze setter or can be programmed by a lower power interface between a rack and the weapon. Other embodiments are clearly possible to those skilled in the art. The antenna serves a dual purpose for handoff and GPS. In other words, the antenna is configured to receive instructions after launching from the delivery vehicle to guide the weapon to the target. Typically, power to the weapon is not required prior to launch, therefore no umbilical cable is needed. Alternative embodiments for power to GPS prior to launch are also contemplated herein.

The modular design of the weapon allows the introduction of features such as GPS and other sensors as well. Also, the use of a modular warhead 340 with heavy metal ballast makes the low cost kinetic [no high explosives ("HE")] design option practical and affordable.

As illustrated in an exemplary embodiment of a weapon in the TABLE 1 below, the weapon may be designed to have a similar envelope, mass, and center of gravity already present in existing aircraft for a practice bomb version thereof. Alternatively, the weapon may be designed with other envelopes, masses, and centers of gravity, as may be available with other configurations, as also being included within the constructs of this invention.

TABLE 1

| FUNCTION | MATERIAL | DENSITY (LB/CU IN) | WEIGHT (LB) | VOLUME (CU IN) |
|---|---|---|---|---|
| Ballast/KE | Tungsten | 0.695 | 20.329 | 29.250 |
| Structure, Metal Augmented Charge ("MAC") Explosive | Aluminum | 0.090 | 0.270 | 3.000 |
| Dome | Pyrex | 0.074 | 0.167 | 2.250 |
| Structure | Steel | 0.260 | 1.430 | 5.500 |
| Guidance | Misc Electronics | 0.033 | 0.800 | 24.000 |
| Primary Explosive | Polymer Bonded Explosive ("PBX") | 0.057 | 2.040 | 36.000 |
| Total | SSW | 0.250 | 25.036 | 100.000 |
| MK-76 | | 0.250 | 25.000 | 100.000 |

In the above example, the weapon is MK-76 derived, but others such as BDU-33 are well within the broad scope of the present invention. The weapon provides for very low cost of aircraft integration. The warhead 340 is large enough for useful warheads and small enough for very high carriage density. The modular design of the weapon allows many variants and is compatible with existing handling and loading methods.

The following TABLEs 2 and 3 provide a comparison of several weapons to accentuate the advantages of small smart weapons such as the MK-76 and BDU-33.

TABLE 2

| CANDIDATE | AIRCRAFT ("A/C") CLEARED | WEIGHT (LB) | DIAMETER (IN- APPROX) | REMARKS |
|---|---|---|---|---|
| LGB/MK-81 | None | 250+ | 10 | Canceled variant |
| MK-76/BDU33 | All | 25 | 4 | Low drag practice bomb |
| BDU-48 | All | 10 | 3.9 | High drag practice bomb |
| MK-106 | All | 5 | 3.9 | High drag practice bomb |
| SDB | Most US | 285 | 7.5 | GBU-39 Small Dia. Bomb |

TABLE 3

| CANDIDATE | CLEARED ON MANY A/C? | LARGE ENOUGH FOR WARHEAD? | VIABLE FOR EXPORT? | HIGH DENSITY CARRIAGE? | COMPATIBLE WITH TUBE LAUNCH? |
|---|---|---|---|---|---|
| LGB/MK-81 | No | Yes | Yes | No | No |
| MK-76/BDU33 | All | Yes | Yes | Yes | Yes |
| BDU-48 | All | No | Yes | Yes | Yes |
| MK-106 | All | No | Yes | Yes | Yes |
| SDB | Most US | Yes | No | Yes | No |

The aforementioned tables provide a snapshot of the advantages associated with small smart weapons, such as, procurements are inevitable, and the current weapons have limited utility due to political, tactical, and legal considerations. Additionally, the technology is ready with much of it being commercial off-the-shelf technology and the trends reflect these changes. The smart weapons are now core doctrine and contractors can expect production in very large numbers. Compared to existing systems, small smart weapons exhibit smaller size, lower cost, equally high or better accuracy, short time to market, and ease of integration with an airframe, which are key elements directly addressed by the weapon disclosed herein. As an example, the small smart weapon could increase an unmanned combat air vehicle ("UCAV") weapon count by a factor of two or more over a small diameter bomb ("SDB") such as a GBU-39/B.

The small smart weapons also address concerns with submunitions, which are claimed by some nations to fall under the land mine treaty. The submunitions are a major source of unexploded ordnance, causing significant limitations to force maneuvers, and casualties to civilians and blue forces. Submunitions are currently the only practical way to attack area targets, such as staging areas, barracks complexes, freight yards, etc. Unexploded ordnance from larger warheads are a primary source of explosives for improvised explosive devices. While the broad scope of the present invention is not so limited, small smart weapons including small warheads, individually targeted, alleviate or greatly reduce these concerns.

Figure 4:
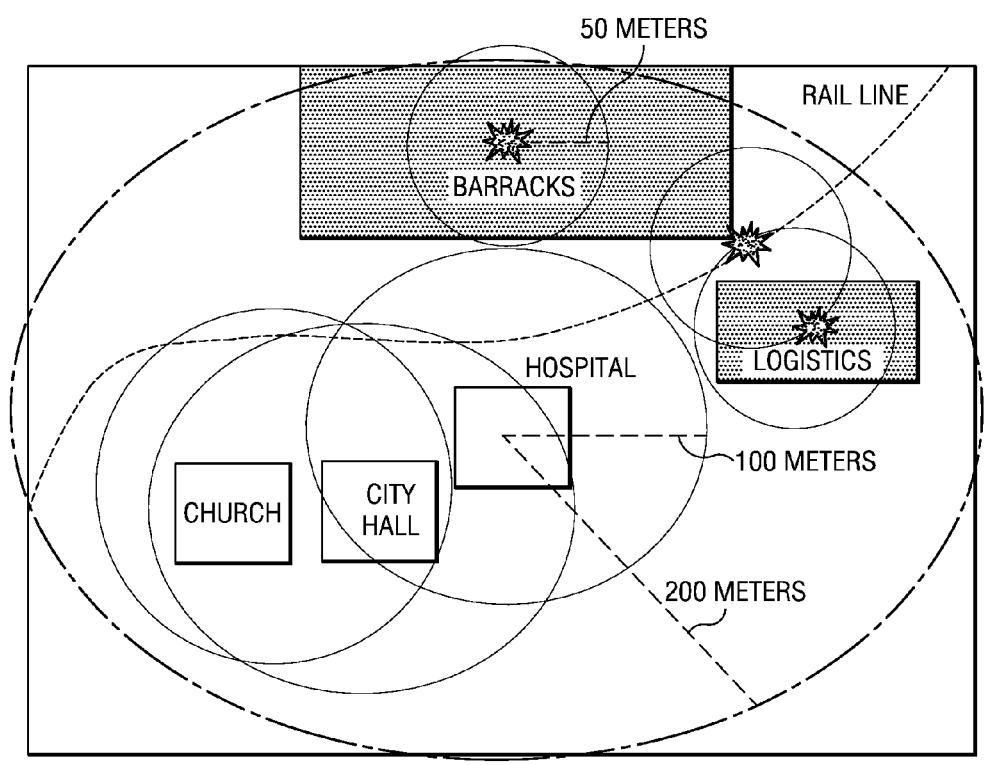
FIG. 4 illustrates a diagram demonstrating a region including a target zone for a weapon system in accordance with the principles of the present invention.

Turning now to FIG. 4, illustrated is a diagram demonstrating a region including a target zone for a weapon system in accordance with the principles of the present invention. Analogous to the regions illustrated with respect to FIG. 2, the entire region is about 200 meters (e.g., about 2.5 city blocks) and the structures that are not targets take up a significant portion of the region. In the illustrated embodiment, the lethal diameter for the weapon is about 10 meters and the danger close diameter is about 50 meters. Thus, when the weapon strikes the barracks, rail line or logistics structure as shown, the weapon according to the principles of the present invention provides little or no collateral damage to, for instance, the hospital. While only a few strikes of a weapon are illustrated herein, it may be preferable to cause many strikes at the intended targets, while at the same time being cognizant of the collateral damage.

In an exemplary embodiment, a sensor of the weapon detects a target in accordance with, for instance, pre-programmed knowledge-based data sets, target information, weapon information, warhead characteristics, safe and arm events, fuzing logic and environmental information. In the target region, sensors and devices detect the target and non-target locations and positions. Command signals including data, instructions, and information contained in the weapon (e.g., a control section) are passed to the warhead. The data, instructions, and information contain that knowledge which incorporates the functional mode of the warhead such as safe and arming conditions, fuzing logic, deployment mode and functioning requirements.

The set of information as described above is passed to, for instance, an event sequencer of the warhead. In accordance therewith, the warhead characteristics, safe and arm events, fuzing logic, and deployment modes are established and executed therewith. At an instant that all conditions are properly satisfied (e.g., a folding lug switch assembly is closed), the event sequencer passes the proper signals to initiate a fire signal to fuzes for the warhead. In accordance herewith, a functional mode for the warhead is provided including range characteristics and the like. Thereafter, the warhead is guided to the target employing the guidance section employing, without limitation, an antenna and global positioning system.

Thus, a class of warhead assemblies, constituting systems, methods, and devices, with many features, including multiple, modular guidance subsystems, avoidance of collateral damage, unexploded ordinance, and undesirable munitions sensitivity has been described herein. The weapon according to the principles of the present invention provides a class of warheads that are compatible with existing weapon envelopes of size, shape, weight, center of gravity, moment of inertia, and structural strength, to avoid lengthy and expensive qualification for use with manned and unmanned platforms such as ships, helicopters, self-propelled artillery and fixed wing aircraft, thus constituting systems and methods for introducing new weapon system capabilities more quickly and at less expense. In addition, the weapon system greatly increases the number of targets that can be attacked by a single platform, whether manned or unmanned.

Figure 5:
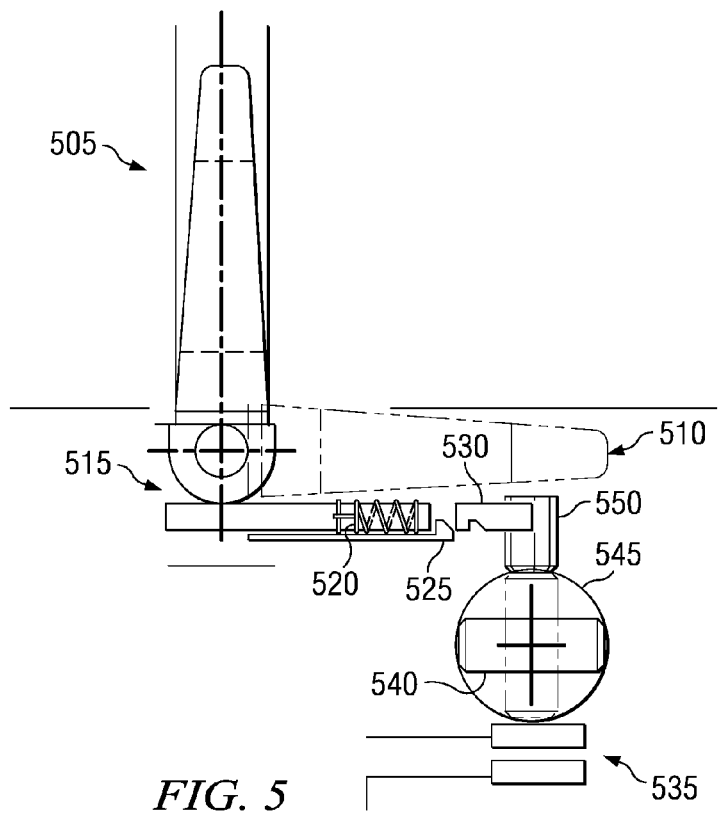
FIG. 5 illustrates a diagram of an embodiment of a folding lug switch assembly constructed in accordance with the principles of the present invention.

Turning now to FIG. 5, illustrated is a diagram of an embodiment of a folding lug switch assembly constructed in accordance with the principles of the present invention. More specifically, a folding lug of the folding lug switch assembly is shown in an upright position 505 and in a folded position 510. The folding lug switch assembly includes a rack and pinion 515, which in an alternative embodiment can also be a cam. The folding lug switch assembly also includes a return spring 520 that provides the energy to fold the folding lug down and retract a retracting cam 525, which interacts with a switch sear 530 to release an arming pin 535 and thus activate an arming rotor 540, an arming plunger 545, and finally a power switch 550. This invention comprehends a folding lug switch assembly that may have multiple functions beyond arming including weapon guidance. It may also have multiple poles and multiple throws that, as an example, may be used for purposes such as isolating arming circuits from other circuits.

Referring once more to the target sensor discussed above, a semi-active laser ("SAL") seeker is typically the most complex item in SAL guided systems, and SAL is the most commonly used means of guiding precision weapons. Therefore, a low cost and compact approach, consistent with a very confined space, is highly desirable.

Figure 6A:
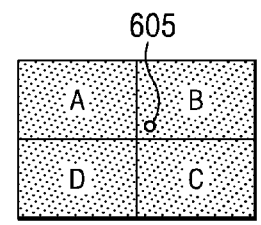
FIGS. 6A and 6B illustrate diagrams demonstrating a four quadrant semi active laser detector constructed in accordance with the principles of the present invention.
Figure 6B:
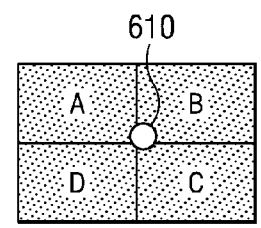

Turning now to FIGS. 6A and 6B, illustrated are diagrams demonstrating a four quadrant semi active laser detector constructed in accordance with the principles of the present invention. More specifically, FIG. 6A represents a typical four quadrant seeker having quadrants A, B, C, and D. This system is capable of providing both elevation information ("EL") and azimuth information ("AZ") according to the following equations:

$$EL=((A+B)-(C+D))/(A+B+C+D),\text{ and}$$

$$AZ=((A+D)-(B+C))/(A+B+C+D)$$

A reflected spot from a laser 605 is shown in quadrant B where the spot is focused on the plane of the active detecting area.

Turning now to FIG. 6B, illustrated is the same basic conditions of FIG. 6A, except that a spot 610 has been intentionally defocused so that, for a target near bore sight, a linear (i.e., proportional) output results. By these illustrations, it is therefore seen that focused systems are prone to indicate in which quadrant a signal may reside, while a defocused system will support proportional guidance as shown by illuminating more than one quadrant in the region of boresight where proportional guidance is most important.

Figure 7A:
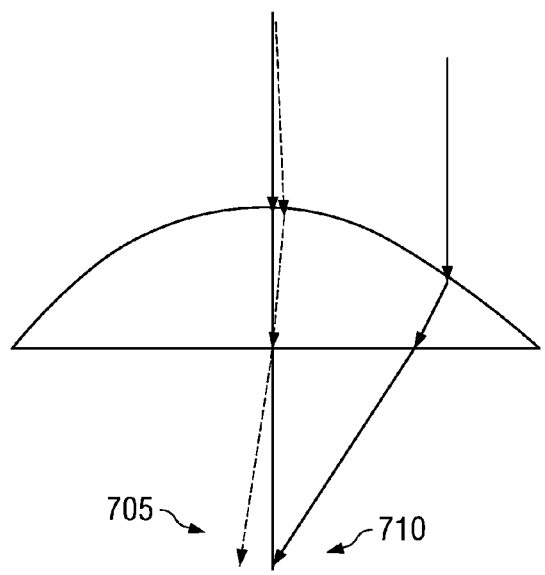
FIGS. 7A and 7B illustrate the properties of a conventional and fast fresnel lens ("FFL") constructed in accordance with the principles of the present invention.
Figure 7B:
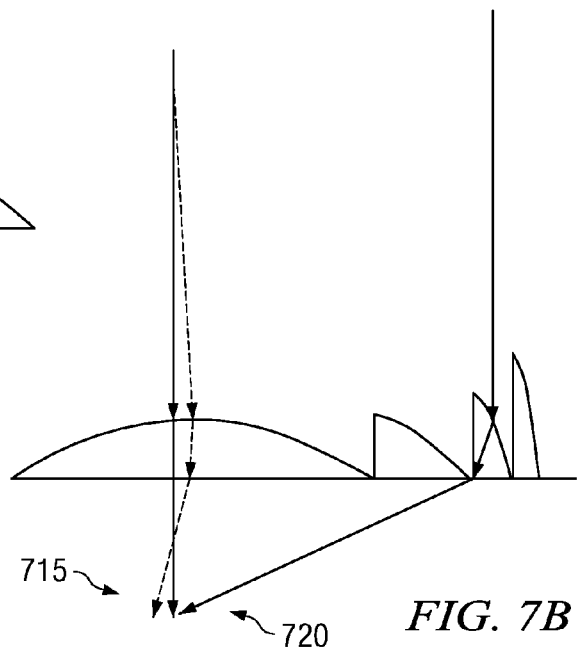

Turning now to FIGS. 7A and 7B, illustrated are the properties of a conventional and fast fresnel lens ("FFL") constructed in accordance with the principles of the present invention. More specifically, FIG. 7A illustrates an embodiment of the focusing element of a SAL employing a conventional convex lens. The small volumes require fast optics which are usually expensive. Also, linear outputs are hard to achieve with fast optics or low cost, and nearly impossible with both. Point 710 illustrates a correct focus point and point 705 illustrates error in the lens' focusing ability. For reasonable angles, this error is often quite small.

Turning now to FIG. 7B, illustrated is an illustration of an embodiment of the present invention employing a FFL. A fresnel lens is a type of lens invented by Augustin-Jean Fresnel and originally developed for lighthouses, as the design enables the construction of lenses of large aperture and short focal length without the weight and volume of material which would be required in conventional lens design. Compared to earlier lenses, the fresnel lens is much thinner, thus passing more light. Note that it is often constructed with separate concentric ridges. This innovative approach provides reductions in weight, volume, and cost. A point 720 illustrates a correct focus, wherein a point 715 illustrates an error in the FFL's ability to provide a correct focus. Though this lens is smaller and lighter, the error in correct focus, even for small angles off boresight is not insignificant.

An alternative embodiment that specifically addresses the focus errors discussed above for a FFL is to add lens stopping (i.e., optical barriers) in those regions where unwanted energy is most likely to originate. This slightly reduces the amount of light passed on by the lens, but also significantly reduces the focusing error for a net gain in performance.

Yet another embodiment of this invention is to replace the concentric circles of the FFL with randomized circles as illustrated in FIG. 8. Fresnel lens boundaries between surfaces are well known sources of some of the problems illustrated above. Concentric circles 805 are typical of this problem. By innovatively using a pseudo-random walk to define the boundaries, instead of concentric circles, the scattering is much more random, resulting in a less focused scattering pattern and therefore focusing errors are less likely to constructively interfere. Thus, the fast fresnel lens is formed from multiple substantially concentric circles to which is added a pseudo-random walk that results in small local perturbations of a respective substantially concentric circle. In other words, the fast fresnel lens is formed from multiple substantially concentric circles that include random perturbations 810. Additionally, for lenses that are cast, rather than ground, there is no need for the lens surface boundaries to be circular. Yet another embodiment of this invention is to introduce multi-element hybrid optics employing both conventional and hybrid optics.

Turning now to FIGS. 9A and 9B, illustrated are views of an embodiment of hybrid optics employable with a guidance section of a weapon constructed in accordance with the principles of the present invention. FIG. 9A illustrates an embodiment employing a clear front lens 905 with no optical properties other than being transparent at the optical wavelength of interest. The focusing is accomplished by a FFL 910 as illustrated by rays 915, 920 where it can be seen that no focusing is accomplished by the clear front lens. Contrast this with the embodiment illustrated in FIG. 9B where a front lens 925 of a target sensor of the guidance section, in concert with a FFL 930 focuses the incoming optical signals 935, 940 and, in so doing, generates a shorter focal length $F_L$ than was generated in FIG. 9A for the same use of volume. The front lens 925 provides a cover to protect the target sensor from environmental conditions and the FFL 930 behind the front lens 925 cooperates with the front lens 925 to provide a multi-lens focusing system for the target sensor.

Therefore, by placing a small amount of optical focusing power in the front lens 925, the focal length of the FFL 930 is allowed to be longer, making it easier to manufacture, while the optical system of FIG. 9B has the desirable property of a shorter focal length. Also, for clarity, note that the drawings of the FFL are not to scale. These lenses often are composed of hundreds of very small rings that are familiar and commonly known to those skilled in the art. Thus, a hybrid system as described herein employs less glass with additional favorable properties of less weight and optical loss. Finally, yet another embodiment is to use the back planar surface of the FFL 930 as a location for an optical filter 945 for filtering of unwanted wavelengths, for example most of the solar spectrum. An embodiment of the invention is an integral aft section, tail fin, actuators, and prime power.

Figure 10:
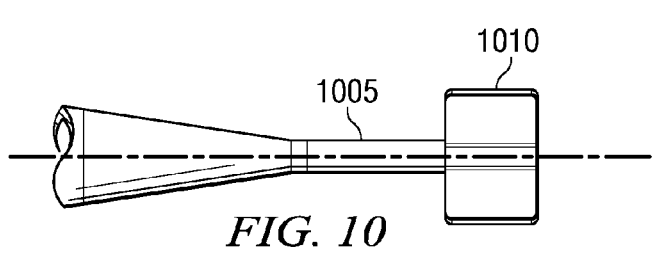
FIG. 10 illustrates a view of an embodiment of an aft section constructed in accordance with the principles of the present invention.

Turning now to FIG. 10, illustrated is a view of an embodiment of an aft section constructed in accordance with the principles of the present invention. More specifically, FIG. 10 illustrates an aft section showing the location of a battery and linear actuators 1005, and each single piece tail fin 1010 to which is attached an axel and linkage level connector. The power elements including batteries used in this application comprehend military batteries, but also include commercial types. As an example, lithium batteries are both light and have a considerable shelf life.

Figure 11:
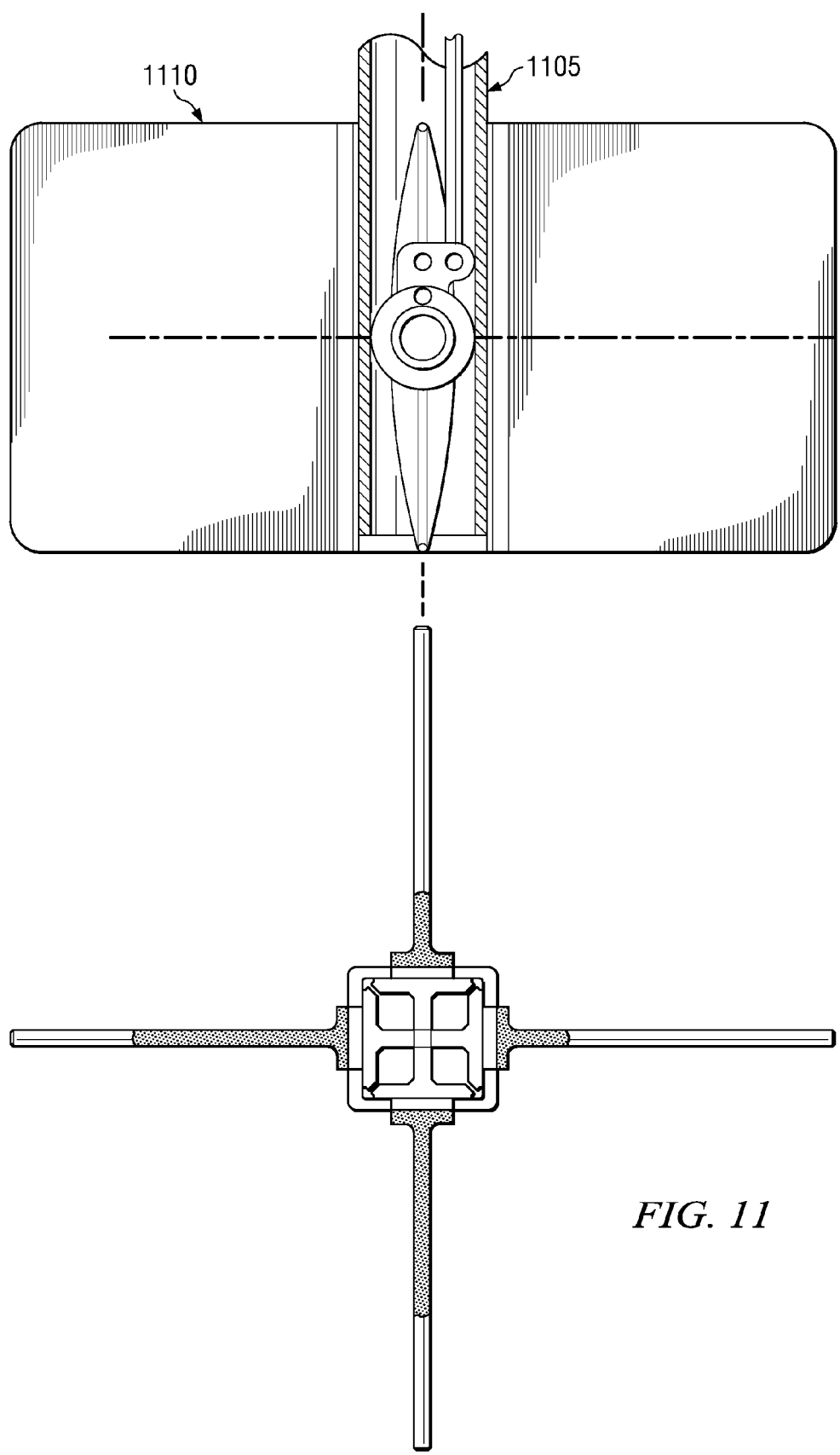
FIG. 11 illustrates a view of an embodiment of an aft section constructed in accordance with the principles of the present invention.

Turning now to FIG. 11, illustrated is a view of an embodiment of an aft section constructed in accordance with the principles of the present invention. More specifically, FIG. 11 demonstrates additional tail fin detail. This innovative design is based on near zero hinge moments and can use linkages and be subjected to forces consistent with radio controlled ("RC") models. Note that the linear actuator fits directly into the tubular aft section 1105. In one embodiment, each of two pairs of tail fins 1110 operate in tandem while in an alternative embodiment, each fin is an independent moving surface. Under certain circumstances, of varying flight conditions, there are advantages to be gained in flight performance by changing the aspect ratio of the wings. This capability is typically relegated to larger aircraft, but this invention comprehends an innovative implementation of providing variable aspect ratio in a very limited space.

Figure 12B:
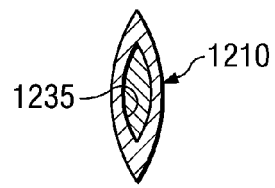
FIGS. 12A and 12B illustrate views of an embodiment of a variable aspect wing ratio for the tail fins of an aft section constructed in accordance with the principles of the present invention.
Figure 12A:
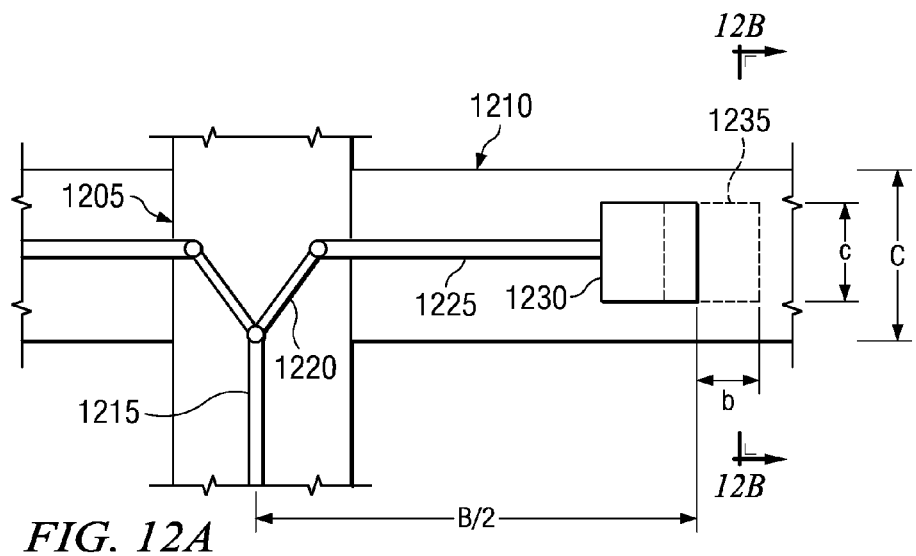

Turning now to FIGS. 12A and 12B, illustrated are views of an embodiment of a variable aspect wing ratio for the tail fins of an aft section constructed in accordance with the principles of the present invention. In this embodiment, a rear fuselage 1205 and tail fins 1210 contain a rod 1215 that moves in a direction, back and forth, along the centerline of the rear fuselage. This causes links 1220 to force rods 1225 along the centerline of the tail fins 1210 in a direction that is normal to rod 1215. In so doing, surface 1230 is retracted and extended as illustrated by extendable surface 1235. An end view (see FIG. 12B) of the tail fin 1210 along with the extendable surface 1235 is also illustrated. Therefore, with surface 1230 retracted, using formulas familiar to those skilled in the art, the aspect ratio A, defined as the ratio of the span of the wings squared to the wing planform (e.g., shape and layout of the tail fin) area is $A=((2(B/2))^2)/(B*C)$. With the extendable surface 1235 extended as shown, the aspect ratio becomes $A=((2*((B/2+b)^2)/(B*C+2*b*c)$, thus clearly showing a change in aspect ratio. Thus, the tail fin 1210 has a modifiable control surface area, thereby changing an aspect ratio thereof. An alternative embodiment using spring steel plates is also comprehended by this invention as discussed below.

Figure 13B:
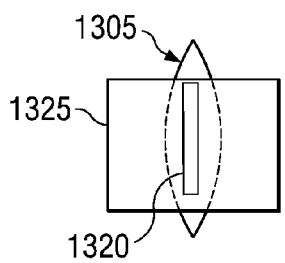
FIGS. 13A to 13F illustrate views of an embodiment of a variable aspect wing ratio for the tail fins of an aft section constructed in accordance with the principles of the present invention.
Figure 13A:
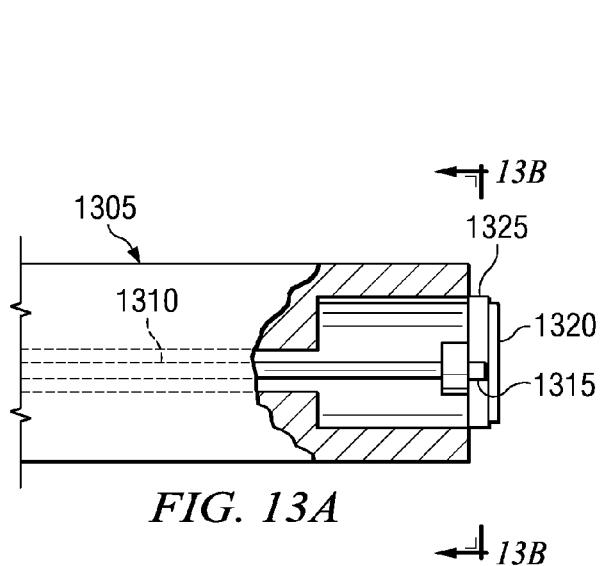
Figure 13C:
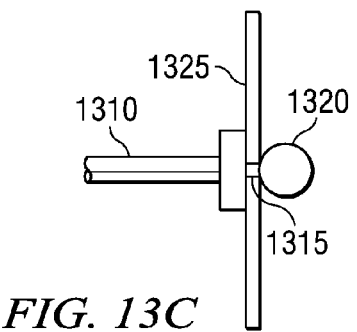
Figure 13D:
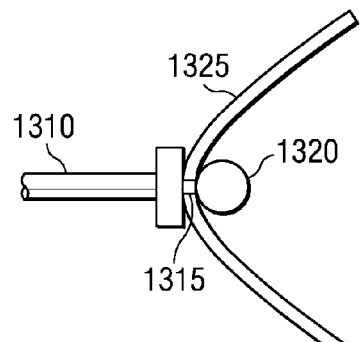
Figure 13F:
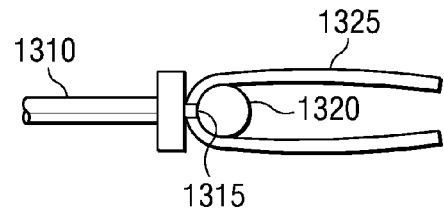
Figure 13E:
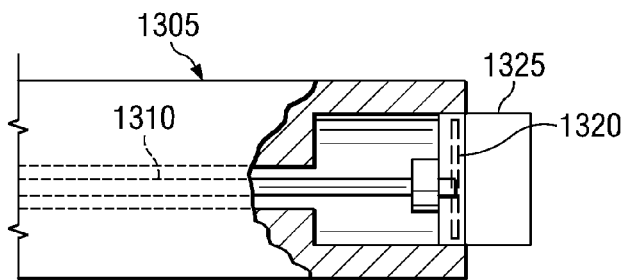

Turning now to FIGS. 13A to 13F, illustrated are views of an embodiment of a variable aspect wing ratio for the tail fins of an aft section constructed in accordance with the principles of the present invention. More specifically, FIG. 13A illustrates a planform view of a tail fin 1305 with a cutout including a rod 1310 that moves in a manner similar to that illustrated in FIGS. 12A and 12B, except that in this embodiment the variable surface is replaced by a deformable surface (e.g., spring steel sheet 1325) shown in the end view of FIG. 13B in an extended status. The spring steel sheet 1325 is coupled to the rod 1310 via a pin 1315 and dowel 1320 as illustrated in FIG. 13C, which provides a front view without the tail fin. Thus, by moving the rod 1330, variable aspect ratio is achieved again in a very confined space. As illustrated in FIG. 13D, the spring steel sheet 1325 is partially retracted to modify the control surface area of the tail fin (not shown in this FIGURE). Finally, FIG. 13E illustrates a planform view of the tail fin 1305 having a cutout with the spring steel sheet 1325 retracted thereby further modifying the control surface area of the tail fin 1305 and changing an aspect ratio thereof (see, also, FIG. 13F, which illustrates a front view with the tail fin removed). Thus, the tail fin 1305 has a deformable surface 1325 coupled to a rod 1310, pin 1315 and dowel 1320 configured to extend or retract the deformable surface 1325 within or without the tail fin 1305.

Figure 14A:
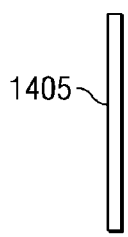
FIGS. 14A to 14D illustrate views of another embodiment of a weapon including the tail fins of an aft section thereof constructed in accordance with the principles of the present invention.
Figure 14B:
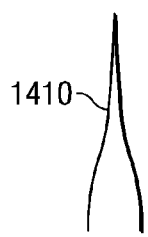
Figure 14D:
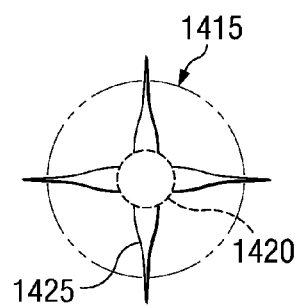
Figure 14C:
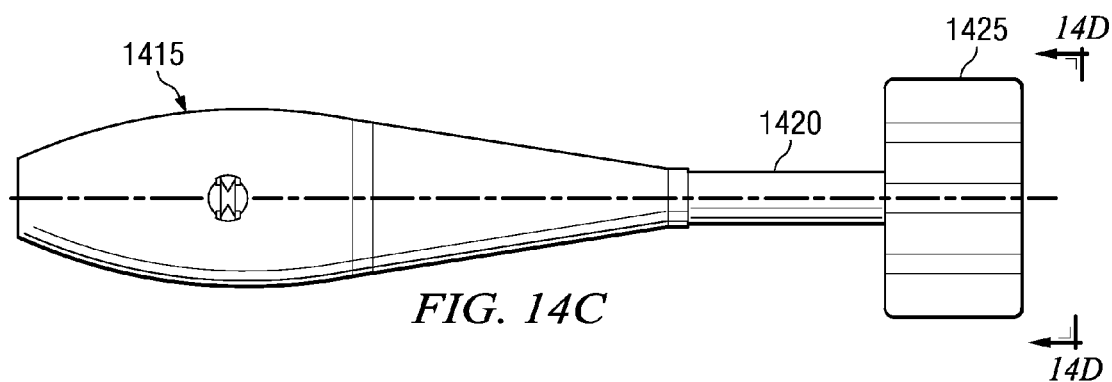

Yet another embodiment of variable aspect ratio is also comprehended by this invention wherein the tail fin dimensions may not change in flight. Referring now to FIGS. 14A to 14D, illustrated are views of another embodiment of a weapon including the tail fins of an aft section thereof constructed in accordance with the principles of the present invention. FIG. 14A illustrates an end view of a present tail fin 1405. For reliability and strength, it may be desirable to change its shape, however, in doing so, the aerodynamic characteristics of the tail fin 1405 may also change dramatically. Therefore, FIG. 14B of the weapon 1415 includes a variably shaped tail fin 1410 that does not vary the aerodynamic characteristics of the tail fin and therefore the weapon. This is because the body of the weapon 1415 as illustrated in FIG. 14C is large with respect to the cylindrical area of the tail section 1420, thereby prohibiting much of the airflow around the tail fins at their base. The end view of FIG. 14D illustrates the shaped tail fin 1425 with characteristics of the flat fin outside the diameter of the weapon body and also showing additional mass and therefore strength in that area of the fin that is not active due to body shading.

Thus, in one embodiment, the weapon includes a warhead including destructive elements and a guidance section with a target sensor configured to guide the weapon to a target. The target sensor includes a front lens configured to provide a cover to protect the target sensor from an environment and a fast fresnel lens behind the front lens to provide a multi-lens focusing system for the target sensor. In a related embodiment, the weapon includes an aft section including a tail fin having a modifiable control surface area thereby changing an aspect ratio thereof.

Additionally, a class of weapon systems, processes, and methods is described with many features, including multiple modular guidance systems, systems for decreasing the cost and time needed to load so called weapons onto a delivery platform or vehicle such as an aircraft, and interfaces that support the same. The systems, processes, and methods are also compatible with existing weapon envelopes of comparable size, shape, weight, center of gravity, moment of inertia, and structural strength. In so doing, the systems avoid lengthy and expensive qualification for use with manned and unmanned delivery platforms such as ships, helicopters, self-propelled artillery and fixed wing aircraft, thus constituting systems and methods for introducing effective new weapon system capabilities more quickly and at less expense. In addition, the systems increase the number of targets that can be attacked by a single delivery platform, whether manned or unmanned. The systems also simplify the integration of a weapon and delivery platform.

As described herein, the weapon system provides an inductive circuit for transfer of both power and data. For example, a number of projectiles use inductive fuze setters to transfer data to the fuse of a shell before it is fired. Use of inductive principles for the transfer of power and data has a lengthy history.

U.S. Pat. No. 3,820,106 to Yamashita, et al. and U.S. Pat. No. 2,295,442 to Wilhelm are examples of delivering both power and a signaling means by a single connection, using inductive principles. Although Wilhelm does not cite specific references, he does make reference to the fact that delivering both power and signaling means over an alternating current circuit was familiar to those skilled in the art at the time.

Inductive electrical and electronic circuits are often used to power signal transmitters because they are durable and offer predictable performance in a variety of environments. Inductive electrical and electronic circuits are used for long-term installations where a battery may not be suitable. An inductive electronic circuit is used in a variety of applications to pass data, signals, and power back and forth, and may also be used in the antennae on both a signal transmitter and a receiver. An example of this application is used in some radio frequency identification ("RFID") tags, where an inductive coupling in both an RFID tag and a reader use mutual inductance to power a microchip which functions like an electronic transmitter, sending data to the reader antenna when the two are brought into close contact. On the other extreme, inductive coupling is proposed as a means to deliver 50 kilowatts for heavy material moving systems, and for electric trains.

Perhaps the most common uses are low power applications, providing between 0.5 watts ("W") and 2 W for toothbrushes, electric shavers, and mobile telephones. More powerful systems are also common in the 2-5W range and are sometimes used for small computers, personal digital assistants, and multi-function mobile telephones. These consumer systems typically require positioning accuracy of a few millimeters in order to align the two coils.

Operating frequencies for these devices are commonly between 100 kilohertz ("kHz") and 1 megahertz ("MHz"), although examples outside this range are familiar to those skilled in the art. These consumer electronics systems are used in conjunction with a wide range of battery types including nickel metal hydride ("NiMH"), lithium ion, and lithium polymer. In order to manage battery life and battery charging, some of these consumer electronics systems employ various means of adjusting the voltage, current and power transferred.

In the case of U.S. Army artillery devices, a wide range of inductive devices allow an artilleryman to set the fuze of a shell or a smart weapon. These devices vary widely in their performance, but it is well known to those familiar with the art that systems exist that transfer approximately 40 kilobits and provide adequate power for a 15 day battery life and further provide confirmation of proper fuze set.

Figure 15:
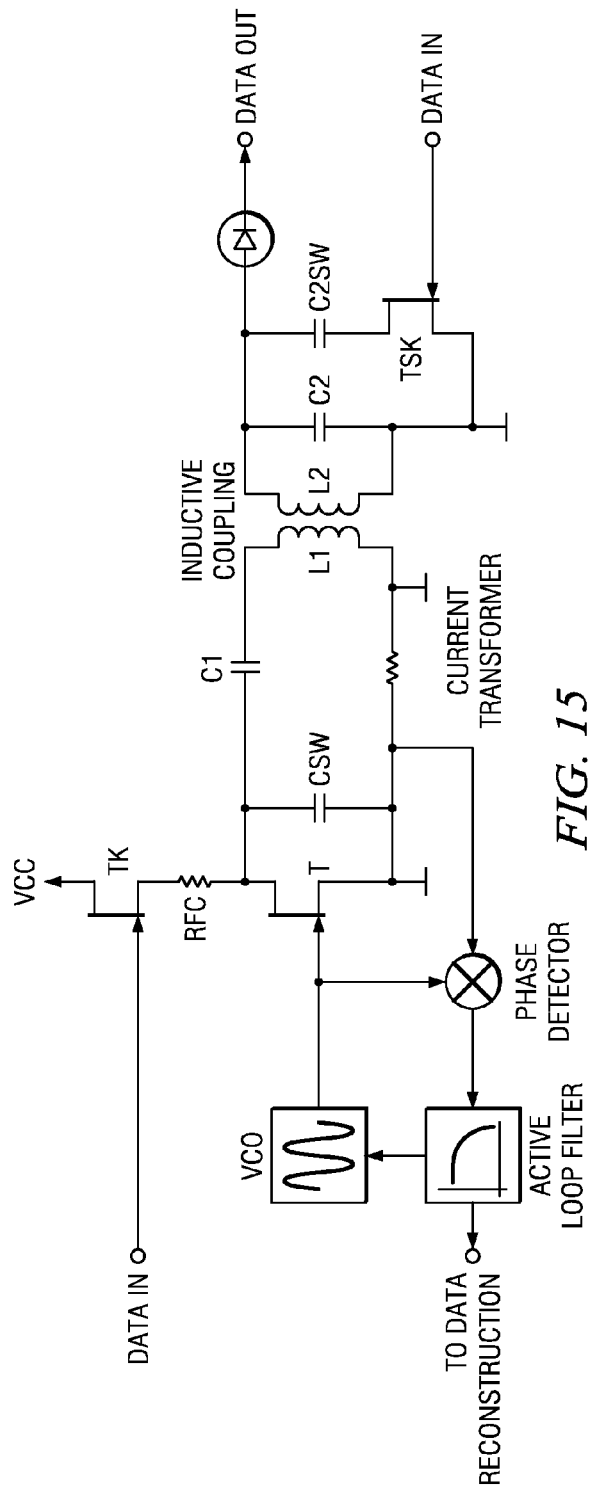
FIG. 15 illustrates a diagram of an exemplary inductive power and data interface.

As an example, FIG. 15 illustrates a diagram of an exemplary inductive power and data circuit. There are links with transferred power for short distances for implantable devices. Such links can provide tens of watts of power, with an efficiency of more than 50 percent at useful coil frequencies. Inductive data and power interfaces are used for a wide range of applications, and there are many examples of inductive interfaces both in industrial products, defense products, and research and in clinical practice.

Weapon to delivery platform interfaces have been the subject of extensive work since the invention of guided weapons in the 1940's. In particular, since the introduction of large numbers of tactical weapons with guidance systems in the 1970's, this has been an area of significant attention. The normal means of communicating with a weapon carried on a delivery platform such as an aircraft is by means of an umbilical cable (as described in U.S. Pat. No. 6,615,116 to Ebert, et al.) and in some cases, by means of an arming wire or lanyard that provides a mechanical indication that a weapon or store has separated from the aircraft. In some cases, the electrical signaling and mechanical indication are combined in a single assembly, as will be familiar to those skilled in the art.

Interchangeability of weapon systems (e.g., guided bombs, rockets, and missiles) is necessary for modern military aircraft. For example, an aircraft may use both air-to-air and air-to-surface weapon systems and may perform both air engagement and ground support roles. However, various and generally unique inputs are required by each weapon type for status monitoring, targeting, arming, and ejecting the weapon system.

Military aircraft are designed to carry a plurality of weapon systems, some of which may not be of the same design. A central computer within the aircraft is responsive to pilot or aircrew commands and communicates with each weapon system to monitor status, perform launch preparation, and execute launch commands. These weapon systems are coupled to a tailored electronics or avionics system that responds to the aircraft controller. This avionics system serves as an interface between the aircraft controller and the weapon systems and is referred to here as a weapon interface system ("WIS"). The weapon interface system receives commands from the aircraft controller and translates these commands to provide mission information usable by one or more weapon systems.

The weapon interface system also receives power from the aircraft and distributes this power to the weapon systems. In addition, the weapon interface system controls and provides launch power to the weapon system ejectors that eject the weapon systems from the aircraft. The mechanical and physical arrangements of carriage, including matters such as ejection and sway bracing, are defined by MIL-STD-8591, which with its revisions and updates is incorporated herein by reference.

As noted, the aircraft may simultaneously carry a number of weapon systems of differing designs, each weapon system design having its own input requirements and providing its own outputs. In addition, the aircraft controller should be able to communicate with a selected weapon system, regardless of its design, independently of other weapon systems, so that, for example, the weapon system can provide status to the aircraft controller and the aircraft controller can specifically designate that weapon system for launch.

In the past, it has been necessary to extend cables from the aircraft controller to each weapon interface system and from the weapon interface system to each weapon system to provide a direct and independent communication interface or link. This design has serious limitations because it unnecessarily adds to the weight of the aircraft, and leads to unnecessary power and cooling requirements, and electromagnetic interference. In response, MIL-STD-1553, entitled "Military Standard—Aircraft Internal Time Division Command/Response Multiplex Data Bus," was introduced, which with its revisions and updates is incorporated herein by reference.

Figure 16:
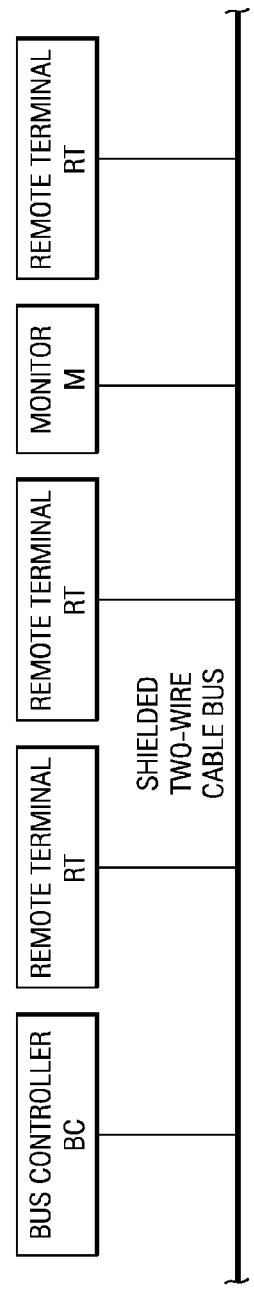
FIG. 16 illustrates a diagram of a representation of the MIL-STD-1553.

Turning now to FIG. 16, illustrated is a diagram of a representation of the MIL-STD-1553. MIL-STD-1553 replaced the multiple cable design with a dual-redundant data bus design having only two shielded twisted pair cables including a primary bus and a backup bus. The dual-redundant data bus provides a common bus for connecting the aircraft controller to each of the weapon carriage assemblies (each at its respective weapon interface system). The weapon interface system of each weapon carriage assembly has a remote terminal for receiving signals from and transmitting signals to the aircraft controller over the MIL-STD-1553 bus. A central processing unit ("CPU") processes these signals, selectively interacting with the various weapon carriage assembly components, and responding to the aircraft controller; and a MIL-STD 1553 bus controller controls transmissions between the central processing unit and the weapon systems over MIL-STD 1553 weapon system buses.

Figure 17:
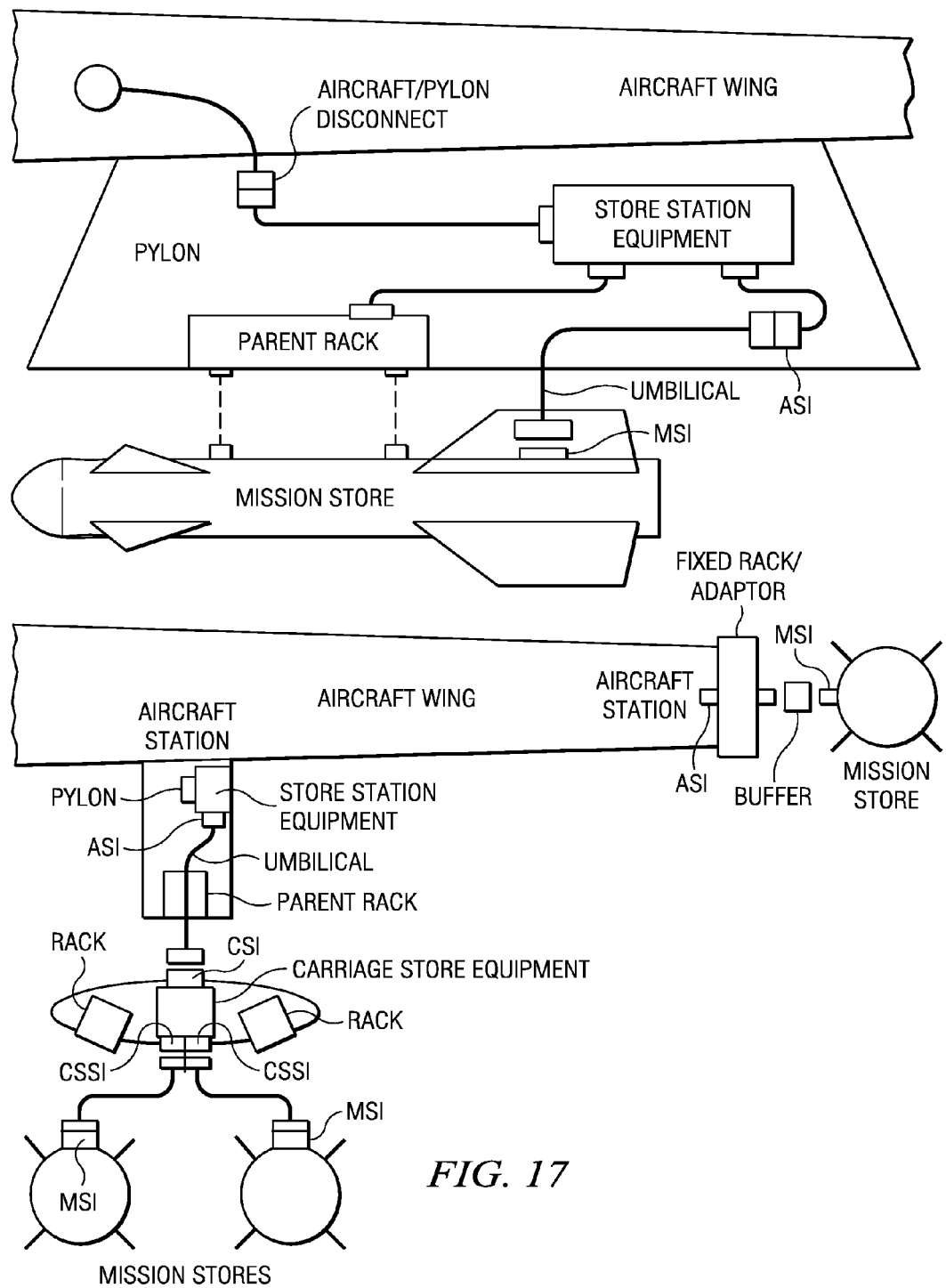
FIGS. 17, 18A and 18B illustrate diagrams of exemplary interfaces controlled by a MIL-STD-1760.

The weapon interface system/weapon system interface requirements for a weapon system capable of using a MIL-STD-1553 weapon interface system are set forth in MIL-STD-1760, entitled "Military Standard—Aircraft/Store Electric Interconnection System," which with its revisions and updates is incorporated herein by reference. FIG. 17 illustrates a diagram of exemplary interfaces controlled by a MIL-STD-1760, wherein ASI represents aircraft station interface, CSI represents carriage station interface, CSSI represents carriage store station interface and MSI represents mission store interface. The MIL-STD-1760 weapon systems include a MIL-STD-1553 remote interface. Electrical isolation is employed by the MIL-STD-1553 for coupled remote terminals and bus controllers. Optical or inductive coupling devices for joining two portions of dual-redundant data weapon system buses are used to provide the isolation.

Figure 18A:
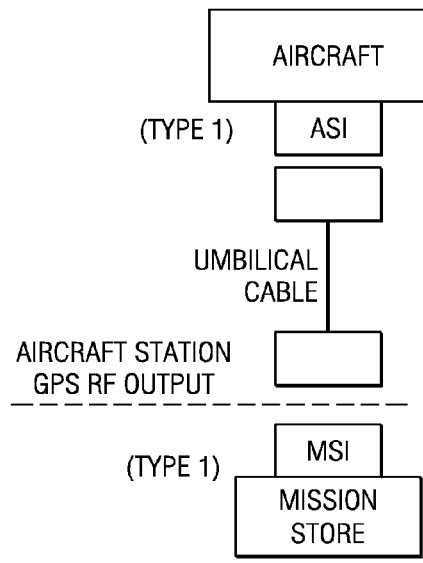
Figure 18B:
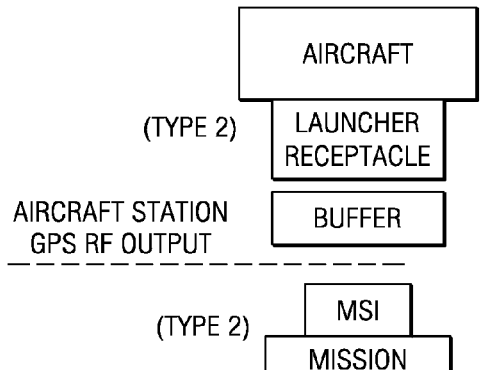

As conceptually illustrated in the block diagrams of FIGS. 18A and 18B, each MIL-STD-1760 compliant weapon is connected to the delivery or launch aircraft by means of an umbilical cable (sometimes referred to as a type one connector) or via a buffer (sometimes referred to as a type two connector) providing some combination of data interconnection, electrical power, logical signaling, and other connections. Since its introduction, weapons and launchers using MIL-STD-1760 have been integrated with delivery or launch platforms such as land vehicles and ships. Therefore, the aircraft interfaces as used herein are exemplary, and are not intended to exclude any other type of platforms from which weapons are released or launched.

The limitations of such connections have been a problem, in part due to the need for loading crews to handle the connections, and to assure that connectors, wires and lanyards are properly installed, and in part due to the potential for weapon failure when they do not disengage properly. Various means have been proposed to deal with the issue, such as the use of infrared systems (for example, see U.S. Pat. No. 5,681,008 to Kinstler and U.S. Pat. No. 4,091,734 to Redmond, et al.).

Specific problems associated with the interconnection means in current use between delivery platforms, such as an aircraft or ship and weapons, include logistical problems caused by the fact that umbilicals, arming wires and lanyards are consumables, and the supply system may fail to provide them in sufficient quantity, at the right time, and in the location where they are needed. In addition, the time required to make and test these connections is often several minutes per weapon. As a result, the critical time to reload an aircraft is extended. Another problem with the present interconnection means is that of expense. As guided weapons have become less expensive, the relative cost of these connections has increased.

Figure 19:
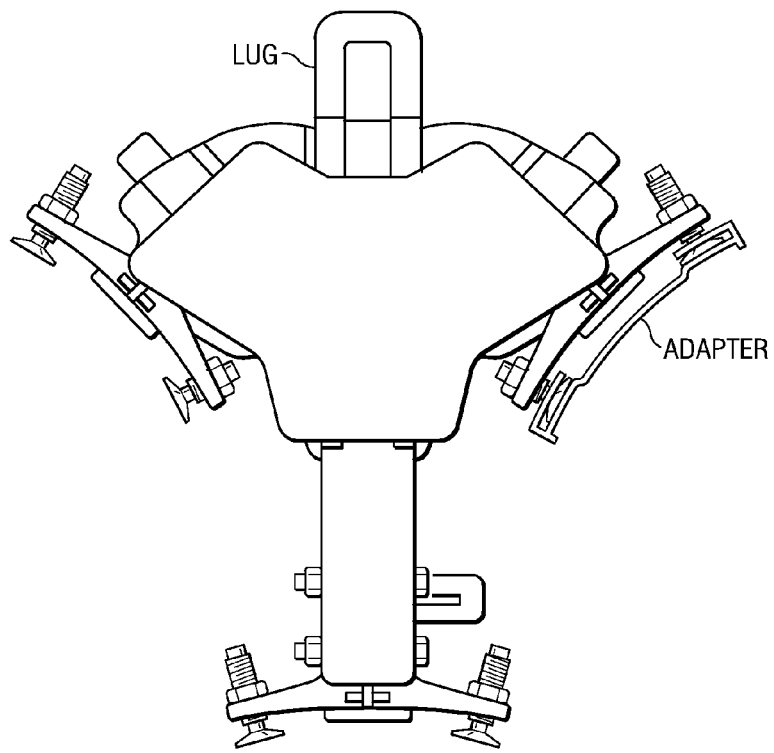
FIGS. 19 and 20 illustrate diagrams of exemplary triple ejector racks.
Figure 20:
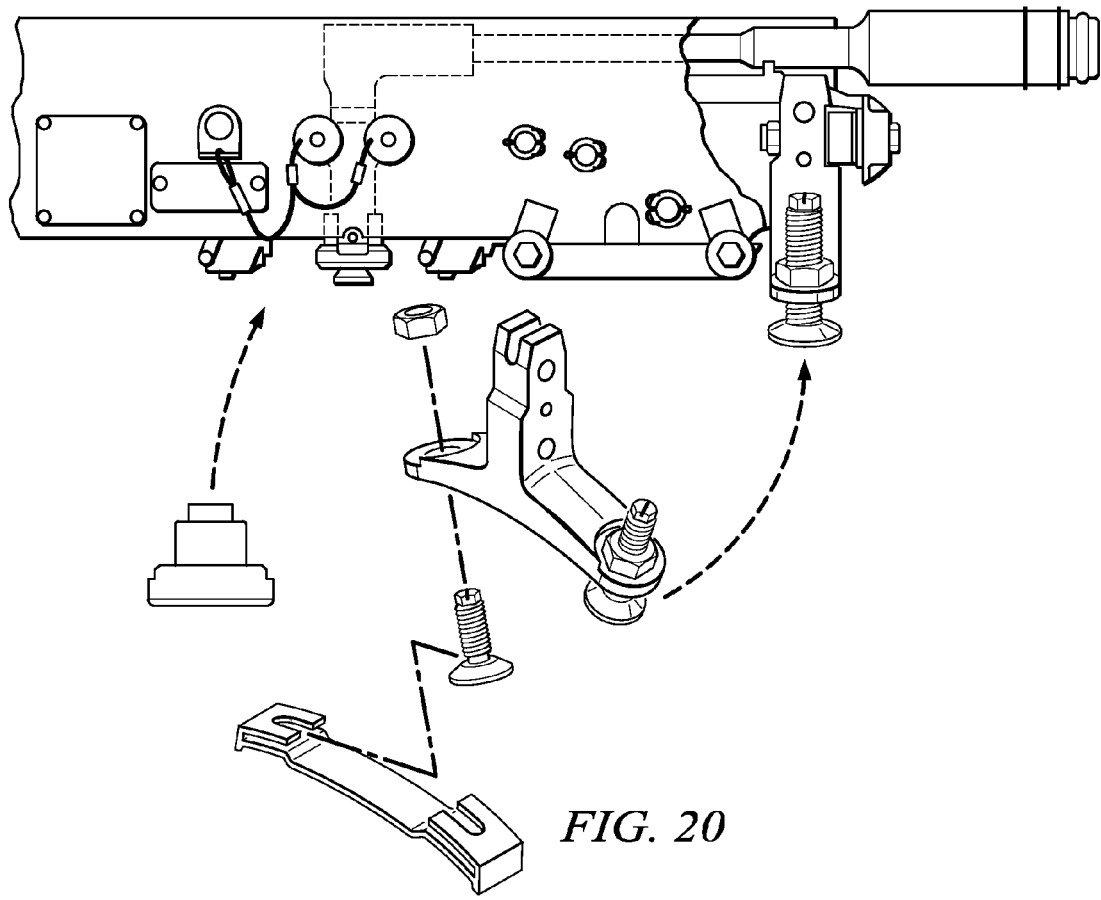

Turning now to FIGS. 19 and 20, illustrated are diagrams of exemplary triple ejector racks. FIG. 19 provides a front view of the triple ejector rack that can carry and eject three stores from a delivery vehicle such as an aircraft. The arched structure at the top of the FIGURE is a suspension lug, which is the primary means of connecting the rack to the aircraft. The angled pads are sway braces. One pair of the sway braces has an adapter, which allows safe carriage of stores that would otherwise be too small to be controlled by the sway braces. FIG. 20 provides a side view of the triple ejector rack. From this illustration, it can be seen that the sway braces can be adjusted to provide positive contact with the store to be carried. The FIGURE also shows the flat spring adapter that fits onto the sway brace foot to control stores that are too small for the sway brace to otherwise control.

Thus, it would be beneficial to provide for a reusable interface, method, and system with the following attributes. The interface should be capable of reuse, serving a plurality of weapon release events and supporting connection of power and data without a direct optical or electrical connection. The interface should be compatible with stringent electromagnetic interference ("EMI") environments and electromagnetic compatibility ("EMC") requirements. The interface should be capable of supporting connections across a plurality of delivery platform types, and support interfaces when the crew actions involve the mechanical loading of the weapon or store to the platform. The system should also be capable of providing a positive indication of weapon release and provide both a primary and backup interface path.

The interface as described herein takes advantage of the fact that the mechanical interface between a delivery platform such as an aircraft and a mission store, such as a weapon or pod, is very carefully controlled. Sway bracing or other means should be provided to restrain the store against impact with the aircraft and against relative motion with respect to the aircraft. The contact areas of the sway braces bearing on the store are controlled so as to be sufficiently large in order to prevent damage to the store. Sway brace requirements are defined in MIL-STD-A-8591. Similarly, careful attention is paid to launch rails, clearance spacing, and other similar matters when rail launching methods are employed. Thus, it is both common and practical to locate an interface with precision and in such a manner as to be compatible with ejection devices, fuze wires, sway braces, and other elements of the aircraft-store system.

In an exemplary embodiment, redundancy is used in the interface. This may be accomplished by means of redundant inductive coupling carrier frequencies, use of both inductive and optical interfaces, by other redundant means such as modulation schemes, and by other similar methods. Redundancy may be desirable to improve reliability, to provide for an interface on the weapon that is compatible with a variety of delivery platforms, and to provide a means for power transmission separate from a means for data transmission. Other outcomes desirable for system performance may also be achieved by redundancy, and this is not an exhaustive list.

An important concern in the field of guided weapons is safety. An example of such a concern is the hazards of electromagnetic radiation to ordnance ("HERO"). Simply stated, HERO considers how electromagnetic energy might cause an unintended explosive event. For the purposes hereof, HERO considerations are important. HERO considerations included herein are band pass filters, which allow the inductive carrier frequency, but exclude unwanted energy; a post-launch switch which changes the connection between the inductive pickup on the weapon and its internal components; and other electromagnetic interference and electromagnetic compatibility design practices. Due to the proven safety of inductive fuze setters, such safety matters in the context of inductive interfaces are known to be practical by those skilled in the art.

Regarding the subject of post-launch switching, an exemplary embodiment uses a single assembly on the weapon for an inductive pickup, and for an antenna. Weapons often employ antennas for systems such as global positioning and data links. The options to change the characteristics of the coupling circuits greatly reduce the problems of such a shared aperture. Such changes may be accomplished by a mechanical switch such as the folding lug switch assembly, or by other means. On the launcher side of the interface, these same principles apply. In addition, an interface foundation may include shielding to prevent the free space radiation of inductive energy or optical energy. Further, incorporation of the mandated MIL-SDT-1553 features, such as coupling transformers, provide additional HERO, electromagnetic interference, and electromagnetic compatibility performance characteristics, in those cases where an interface is based on the 1553 standard.

Figure 21:
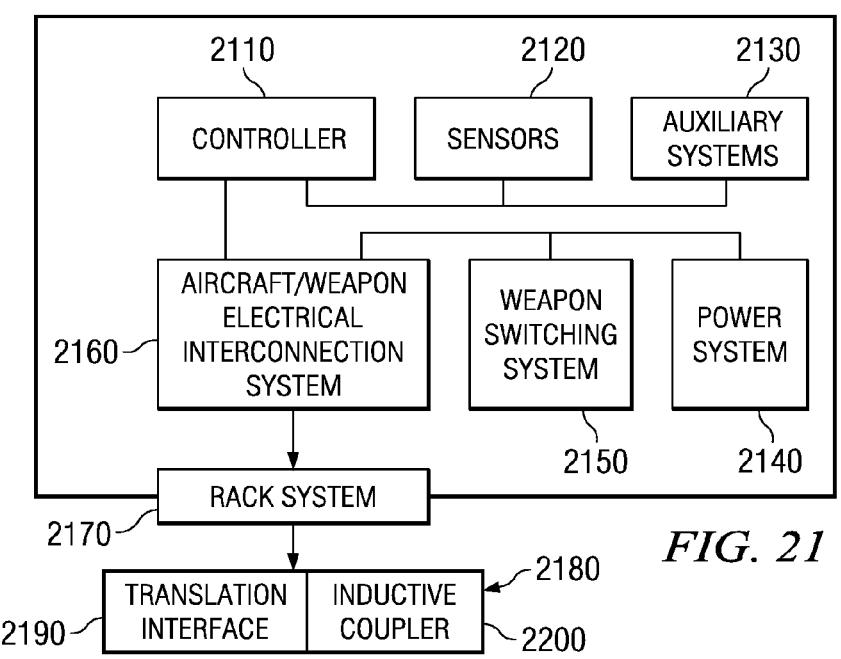
FIG. 21 illustrates a block diagram of an embodiment of a delivery platform constructed according to the principles of the present invention.

Turning now to FIG. 21, illustrated is a block diagram of an embodiment of a delivery platform (e.g., an aircraft) constructed according to the principles of the present invention. The aircraft includes a controller (e.g., a computer) 2110 responsive to pilot or aircrew commands and communicates with each weapon system to monitor status, perform launch preparation, and execute launch commands and mission information. The aircraft also includes sensors 2120 that assist a weapon to detect a target in accordance with, for instance, global positioning, inertial sensing, pre-programmed knowledge-based data sets, target information, weapon information, warhead characteristics, safe and arm events, fuzing logic and environmental information. The aircraft also includes auxiliary systems 2130 to provide auxiliary functions for the aircraft. The aircraft also includes a power system 2140 configured to provide AC and DC power to systems therefor. The aircraft also includes a weapon switching system 2150 configured to provide switching and discrete signals for the weapon systems. The aircraft also includes an aircraft/weapon electrical interconnection system 2160 compatible, for instance, with MIL-STD 1760, configured to provide an electrical interface to a rack system 2170 for the weapon system. The aircraft also includes a weapon interface system 2180 including a translation interface 2190 and a weapon coupler (e.g., an inductive or optical coupler) 2200. The translation interface 2190 provides an interface between the aircraft/weapon electrical interconnection system 2160 and an inductive power and data circuit therein. The weapon coupler 2200 provides an interface to the weapon system to provide real-time mission information thereto.

Figure 22:
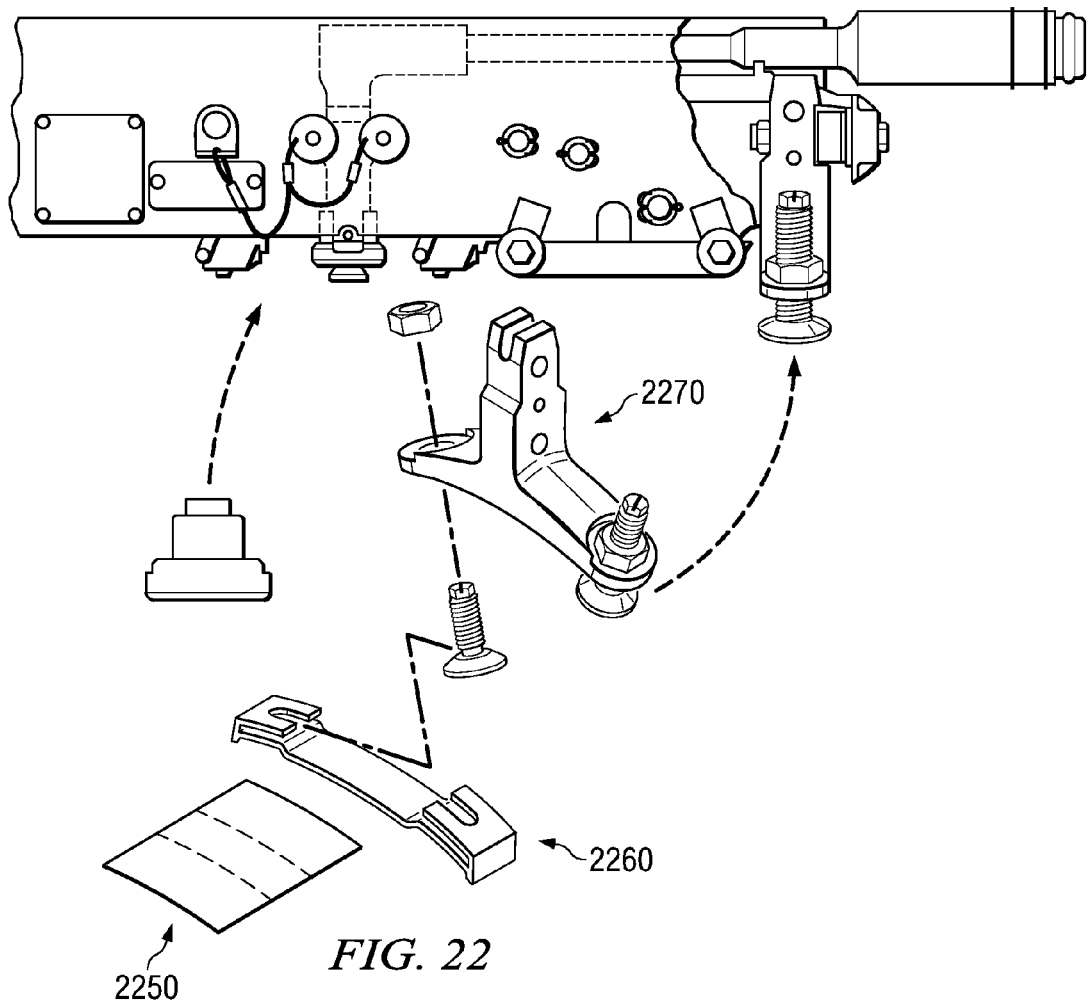
FIG. 22 illustrates a view of an embodiment of a rack system and portions of a weapon interface system constructed according to the principles of the present invention.

Turning now to FIG. 22, illustrated is a view of an embodiment of a rack system and portions of a weapon interface system constructed according to the principles of the present invention. More particularly, FIG. 22 illustrates a side view of a triple ejector rack that ejects weapons from a delivery platform such as an aircraft. A weapon coupler (e.g., an inductive coupler) 2250 of the weapon interface system is formed from a flexible material being substantially planar, such as polycarbonate, formed into a flat spring adapter that fits onto the familiar adapter, which in turn connects to sway brace foot 2260. Thus, it positions an interface, providing location control, a paramagnetic structure, and still provides a means to control stores that are too small for the sway brace 2270 to otherwise control.

Figure 23:
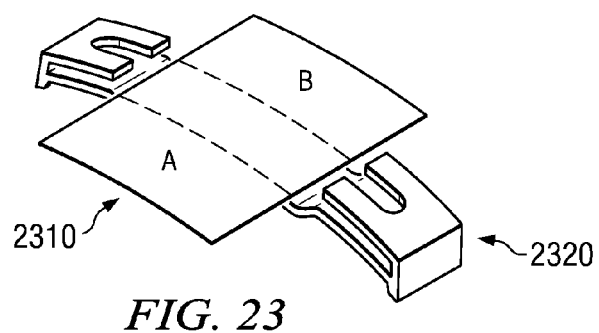
FIG. 23 illustrates a diagram of an embodiment of a weapon coupler constructed according to the principles of the present invention.

Turning now to FIG. 23, illustrated is a diagram of an embodiment of a weapon coupler (e.g., an inductive coupler) 2310 constructed according to the principles of the present invention. The inductive coupler 2310 is formed from a flexible material, such as polycarbonate formed into flat spring adapter which fits onto the familiar adapter. Note that there are two positions A and B, which do not require a penetration of the current adapter 2320. Penetration of the current spring adaptor 2320 has advantages in some exemplary embodiments, but is not necessary, as shown here.

Figure 24:
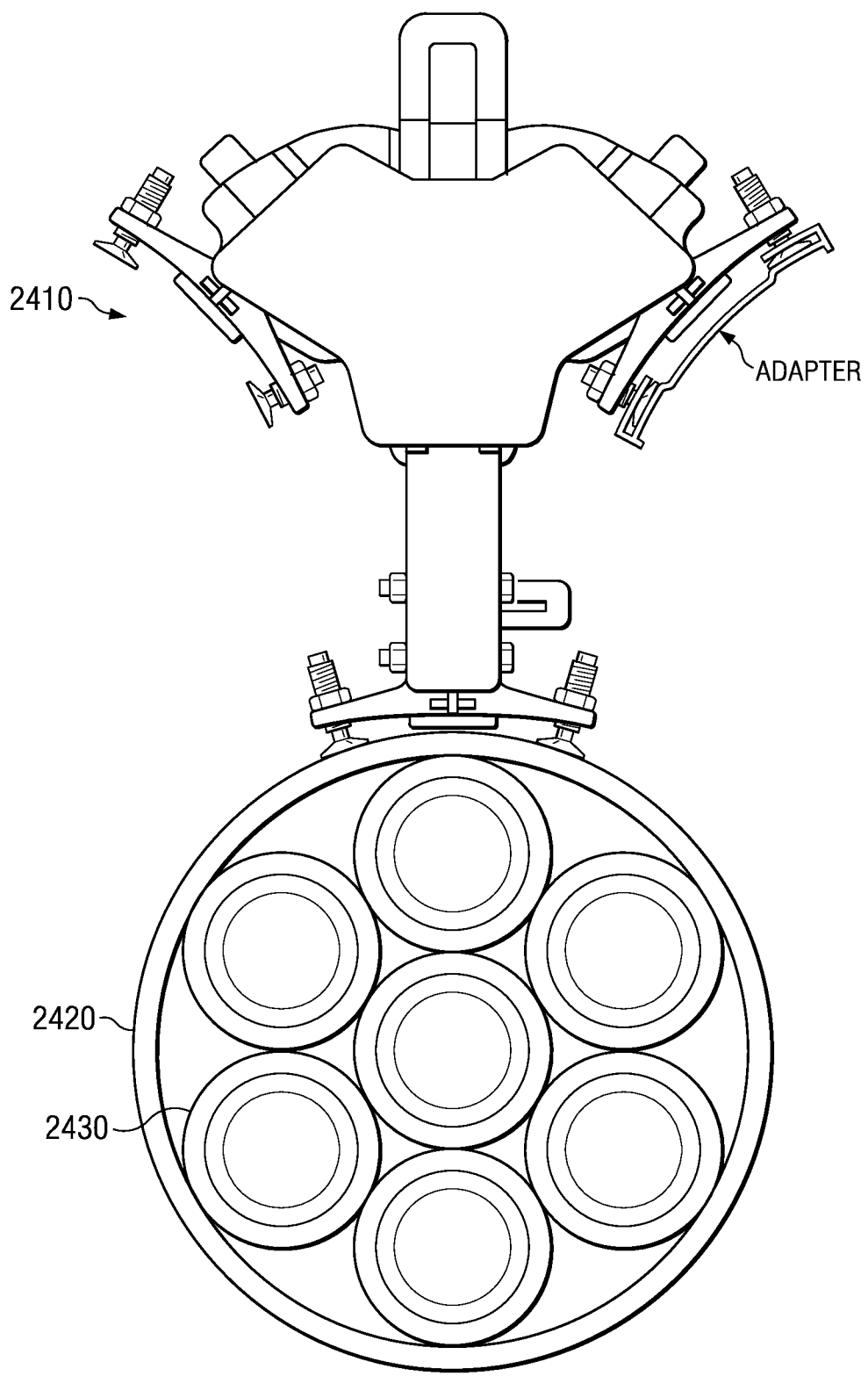
FIG. 24 illustrates a view of an embodiment of a rack system and portions of a weapon interface system constructed according to the principles of the present invention.
Figure 25:
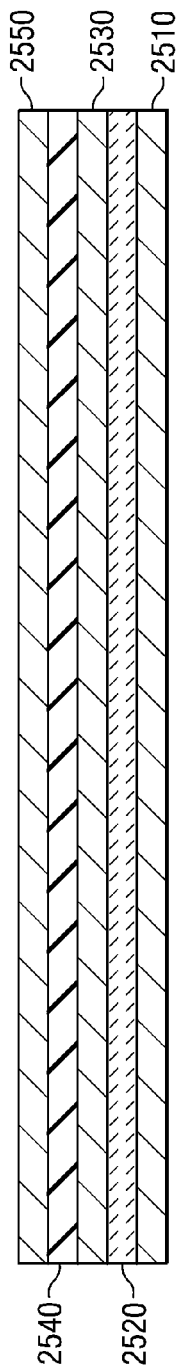
FIGS. 25 to 28B illustrate cross sectional views of embodiments of weapon couplers constructed according to the principles of the present invention.

Turning now to FIG. 24, illustrated is a view of an embodiment of a rack system (e.g., a triple ejector rack) 2410 and portions of a weapon interface system constructed according to the principles of the present invention. A canister, or launch tube 2420 of the weapon system is suspended from the triple ejector rack 2410. The canister 2420 contains one or more weapons or munitions 2430 to be delivered. A weapon coupler (e.g., an inductive or optical coupler) is constructed to provide a means of data and/or power transfer as previously described. This extends the previous weapon coupler to an entire canister 2420, instead of an arced plate as shown in the previous FIGURE. An interface coil of the weapon coupler may extend coaxially about the canister so as to allow weapon system loading independent of rotational orientation.

Turning now to FIGS. 25 to 28B, illustrated are cross sectional views of embodiments of weapon couplers constructed according to the principles of the present invention. Beginning with FIG. 25, the weapon coupler (e.g., inductive coupler) includes a weapon interface (e.g., a Teflon interface to a weapon) 2510, an inductive coil (e.g., Mylar with inductive coil printed thereon) 2520, a spacer (e.g., a Teflon spacer) 2530, a shield (e.g., a magnetic shielding material such as Metglas magnetic alloy 2705M) 2540, and a protection layer (e.g., a Teflon abrasion protection layer) 2550.

Figure 26:
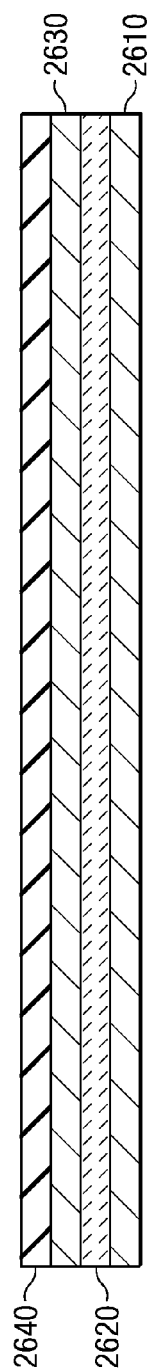
Figure 27:
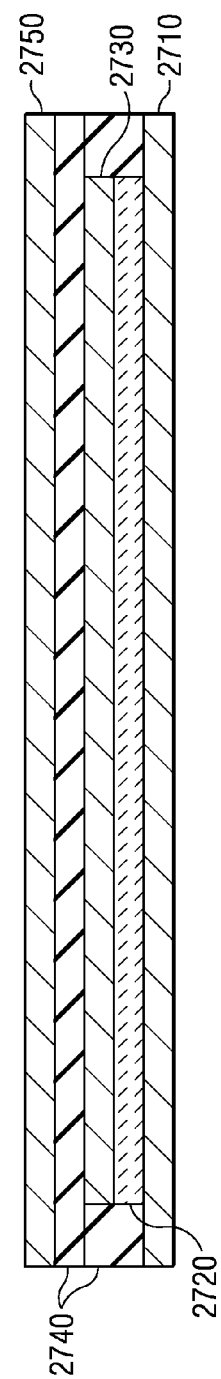

Regarding FIG. 26, the weapon coupler (e.g., inductive coupler) includes a weapon interface (e.g., a Teflon interface to a weapon) 2610, an inductive coil (e.g., Mylar with inductive coil printed thereon) 2620, a spacer (e.g., a Teflon spacer) 2630, and a spring steel layer (e.g., a Teflon abrasion protection layer) 2640. Regarding FIG. 27, the weapon coupler (e.g., inductive coupler) includes a weapon interface (e.g., a Teflon interface to a weapon) 2710, an inductive coil (e.g., Mylar with inductive coil printed thereon) 2720, a spacer (e.g., a Teflon spacer) 2730, a shield (e.g., a magnetic shielding material such as Metglas magnetic alloy 2705M) 2740, and a protection layer (e.g., a Teflon abrasion protection layer) 2750.

Figure 28A:
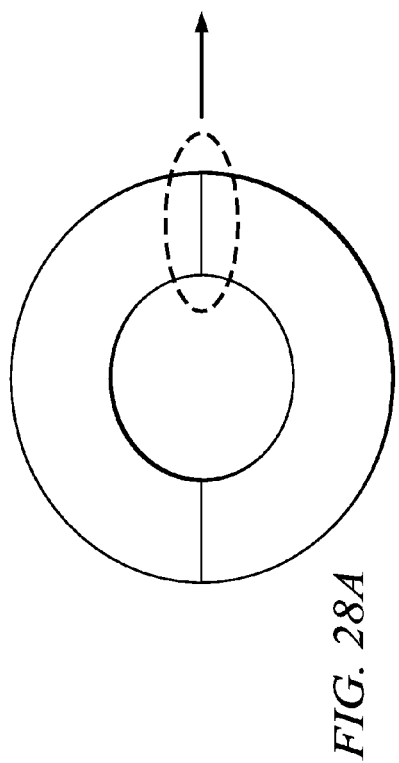
Figure 28B:
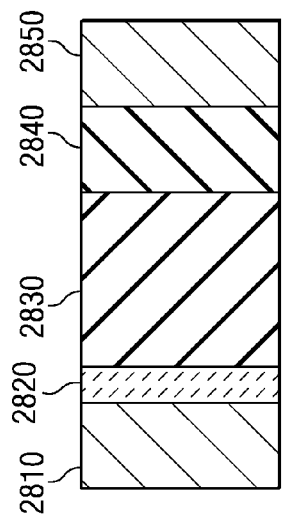

Regarding FIGS. 28A and 28B, illustrated are side and cross sectional views of an embodiment of a weapon coupler (e.g., inductive coupler) constructed according to the principles of the present invention. The weapon coupler includes a weapon interface (e.g., a Teflon interface to a weapon) 2810, an inductive coil (e.g., Mylar with inductive coil printed thereon) 2820, a primary structure (e.g., a Kevlar composite, PVC) 2830, a shield (e.g., a magnetic shielding material such as Metglas magnetic alloy 2705M) 2840, and a protection layer (e.g., a Teflon abrasion protection layer) 2850.

Additionally, exemplary embodiments of the present invention have been illustrated with reference to specific components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of weapon systems. Those skilled in the art will recognize that other embodiments of the invention can be incorporated into a delivery platform including a weapon interface system. Absence of a discussion of specific applications employing principles of a delivery platform and weapon interface system does not preclude that application from falling within the broad scope of the present invention.

Although the present invention has been described in detail, those skilled in the art should understand that they can make various changes, substitutions and alterations herein without departing from the spirit and scope of the invention in its broadest form. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A weapon interface system coupled to an electrical interconnection system of a delivery platform and a weapon system coupled to a rack system, having a canister with at least one weapon therein, comprising:
    a translation interface configured to provide an interface between said electrical interconnection system and an inductive power and data circuit; and
    a weapon coupler, extending coaxially about said canister and including a weapon interface and an inductive coil, configured to provide an inductive coupling to said weapon system.

2. The weapon interface system as recited in claim 1 wherein said weapon coupler is formed from a flexible and substantially planar material and located within a flat spring adapter of said rack system.

3. The weapon interface system as recited in claim 1 wherein said weapon coupler further comprises a spacer, a shield, and a protection layer.

4. The weapon interface system as recited in claim 3 wherein said spacer is a Teflon spacer.

5. The weapon interface system as recited in claim 3 wherein said protection layer is a spring steel layer.

6. The weapon interface system as recited in claim 1 wherein said weapon coupler further comprises a spacer, and a spring steel layer.

7. The weapon interface system as recited in claim 1 wherein said weapon coupler further comprises a primary structure, a shield, and a protection layer.

8. The weapon interface system as recited in claim 7 wherein said primary structure is formed from a Kevlar composite.

9. The weapon interface system as recited in claim 1 wherein said weapon coupler is formed from a polycarbonate material.

* * * * *